(12) United States Patent
Yoshikawa et al.

(10) Patent No.: US 9,688,488 B2
(45) Date of Patent: Jun. 27, 2017

(54) METERING FEEDER

(71) Applicant: YOSHIKAWA CORPORATION, Kagoshima (JP)

(72) Inventors: Osamu Yoshikawa, Kagoshima (JP); Izumi Furukawa, Kagoshima (JP)

(73) Assignee: Yoshikawa Corporation, Kagoshima (JP)

( * ) Notice: Subject to any disclaimer, the term of this patent is extended or adjusted under 35 U.S.C. 154(b) by 157 days.

(21) Appl. No.: 14/428,473

(22) PCT Filed: Aug. 31, 2013

(86) PCT No.: PCT/JP2013/073455
§ 371 (c)(1),
(2) Date: Mar. 16, 2015

(87) PCT Pub. No.: WO2014/065005
PCT Pub. Date: May 1, 2014

(65) Prior Publication Data
US 2015/0246779 A1 Sep. 3, 2015

(30) Foreign Application Priority Data

Oct. 25, 2012 (JP) .................. 2012-235558

(51) Int. Cl.
*G01F 11/00* (2006.01)
*B65G 65/48* (2006.01)
*G01F 11/24* (2006.01)

(52) U.S. Cl.
CPC .......... *B65G 65/4836* (2013.01); *G01F 11/24* (2013.01)

(58) Field of Classification Search
CPC ................................................. B65D 65/4836
(Continued)

(56) References Cited

U.S. PATENT DOCUMENTS 11,226 A * 7/1854 Ide .................. A01C 15/16
222/271
795,031 A * 7/1905 Ebling ............... B65G 65/4836
222/240
(Continued)

FOREIGN PATENT DOCUMENTS

JP 6-171765 6/1994
JP 3090555 9/2000
(Continued)

OTHER PUBLICATIONS

Microfilm of the specification and drawings annexed to the request of Japanese Utility Model Application No. 167539/1982 (Laid-open No. 071219/1984) (Kamacho Scale Co., Ltd.) May 15, 1984 (May 15, 1984), claims; fig. 1 to 6—(Family: none) JP 59-71219.
(Continued)

*Primary Examiner* — Patrick M Buechner
*Assistant Examiner* — Michael J Melaragno
(74) *Attorney, Agent, or Firm* — Jordan and Koda, PLLC

(57) ABSTRACT

A metering feeder is provided with the following: an annular transport space formed by an outer cylinder, an inner cylinder, and a bottom plate; a central rotating blade provided on a rotating shaft in the center of the bottom plate; an outer rotating ring connected to the tip of the central rotating blade; a plurality of outer rotating blades provided on the outer rotating ring so as to point inwards; and a rotating disc in which a powder/granular-material discharge groove is formed, the top surface of said rotating disc lying in the same plane as the top surface of the bottom plate. The outer rotating blades scrape the powder/granular material in the annular-transport space into the powder/granular-material discharge groove, which transports said powder/granular material outside the outer cylinder. This metering feeder is further provided with a vertically-movable scraper for supplying large amounts of the powder/granular material and a (Continued)

fixed small scraper for supplying small amounts thereof. Said scrapers block the flow of the powder/granular material in the powder/granular-material discharge groove in the rotating disc and guide same to a discharge opening. This configuration makes it possible to increase the precision with which the powder/granular material is supplied.

6 Claims, 16 Drawing Sheets

(58) Field of Classification Search
USPC .......................................................... 222/342
See application file for complete search history.

(56) References Cited

U.S. PATENT DOCUMENTS

| | | | | |
|---|---|---|---|---|
| 1,679,557 | A * | 8/1928 | Bailey ................... | G01F 13/001 222/220 |
| 2,030,541 | A * | 2/1936 | Rose ..................... | G01F 13/001 141/131 |
| 2,762,543 | A * | 9/1956 | Winkel ................... | H01M 4/20 141/125 |
| 3,266,677 | A * | 8/1966 | Hamilton .............. | B30B 15/302 222/370 |
| 3,655,104 | A * | 4/1972 | Larson ................... | G01F 11/24 222/317 |
| 3,788,529 | A * | 1/1974 | Christy ................ | A23G 3/2076 222/314 |
| 4,268,205 | A * | 5/1981 | Vacca ................ | B65G 53/4633 222/368 |
| 4,536,121 | A * | 8/1985 | Stewart .............. | B65G 53/4641 222/270 |
| 4,613,058 | A * | 9/1986 | Conger ................... | G01F 11/24 222/342 |
| 4,747,524 | A * | 5/1988 | Krambrock ........ | B65G 53/4616 222/345 |
| 4,784,081 | A * | 11/1988 | Knott ..................... | B01F 5/246 118/612 |
| 5,375,747 | A * | 12/1994 | Yoshikawa ........ | B65G 65/4836 222/410 |
| D368,100 | S * | 3/1996 | Yoshikawa ........ | B65G 65/4836 D15/13 |
| 2003/0213815 | A1* | 11/2003 | Yoshikawa ........ | B65G 65/4827 222/196 |
| 2010/0155433 | A1* | 6/2010 | Toyoda .............. | B65G 65/4836 222/410 |
| 2010/0176159 | A1* | 7/2010 | Yoshikawa ........ | B65G 65/4836 222/370 |
| 2015/0143710 | A1* | 5/2015 | Yoshikawa ........ | B65G 65/4836 34/168 |
| 2015/0246779 | A1* | 9/2015 | Yoshikawa ............. | G01F 11/24 222/71 |

FOREIGN PATENT DOCUMENTS

| | | | |
|---|---|---|---|
| JP | 2002-002965 | 1/2002 | |
| JP | EP 1939120 A1 * | 7/2008 | ......... B65G 65/4836 |

OTHER PUBLICATIONS

Microfilm of the specification and drawings annexed to the request of Japanese Utility Model Application No. 000858/1985 (Laid-open No. 119534/1986) (Mitsubishi Heavy Industries, Ltd.), Jul. 28, 1986 (Jul. 28, 1986), p. 3, line 10 to p. 5, line 16; fig. 1 to 5—(Family: none) JP 61-119534.

* cited by examiner

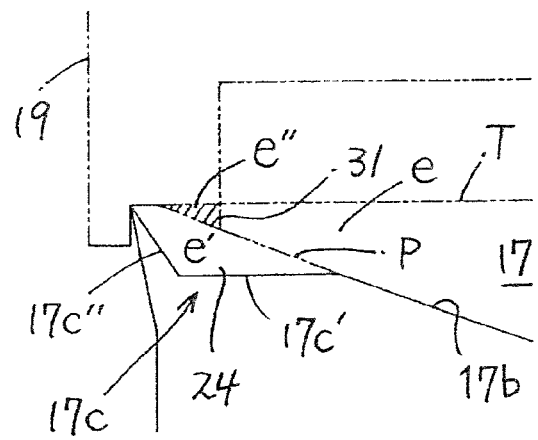
(a)
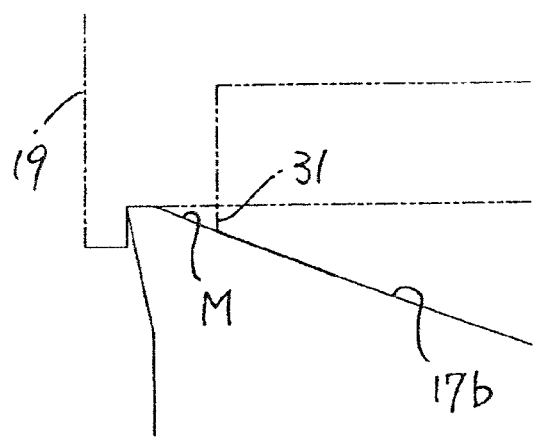
(b)
Fig. 16

METERING FEEDER

TECHNICAL FIELD

The present invention relates to a metering feeder for realizing highly accurate metering supply of a powder/granular material and the like.

BACKGROUND OF THE INVENTION

Conventionally, a metering feeder for metered supply of a material such as a powder/granular material or the like as illustrated in Patent Literature 1, for example, has been developed.

This prior-art metering feeder has a configuration in which an inner cylinder and an outer cylinder are arranged concentrically, a gap is provided between a lower end of the inner cylinder and a bottom plate of the outer cylinder, whereby an annular transport space for a powder/granular material is provided between the inner and outer cylinders, a central rotating blade is provided on the bottom plate around a center upright rotating shaft of the bottom plate, an outer rotating ring along an inner periphery of the outer cylinder is provided at a tip end of the rotating blade, a plurality of outer rotating blades directed toward an inside are provided on the ring, a rotating disc having an upper surface on the same plane as an upper surface of the bottom plate is provided, a powder/granular-material discharge groove concentric with the disc is provided on an upper surface of the disc, the groove is disposed over an inside and outside of the outer cylinder, and a single powder/granular-material discharge scraper is fixed in the groove on an outside of the outer cylinder.

This metering feeder is configured such that, by rotating the central rotating blade and the rotating disc together, the powder/granular material in the annular transport space is scraped and thrown into the powder/granular-material discharge groove of the rotating disc by the outer rotating ring by means of rotation of the central rotating blade, and the powder/granular material having been thrown into the discharge groove is metered and supplied by the single powder/granular-material discharge scraper to an outside of the rotating disc.

CITATION LIST

Patent Literature

Patent Literature 1 Japanese Patent No. 3090555

SUMMARY OF THE INVENTION

With the prior-art metering feeder, in order to realize highly accurate supply in a batch metering of a powder/granular material, a rotating speed of the rotating disc is divided into a normal speed for rushing large supply of the powder/granular material and a low speed for making small supply of the powder/granular material in a final stage of the supply, and the rotating speed of the rotating disc in the small supply is set to a low speed so as to adjust the final supply amount in some cases.

However, in the prior-art metering feeder, since the single powder/granular-material discharge scraper is used, "dripping" of the powder/granular material might occur when the rotating speed of the rotating disc is lowered for the small supply.

Moreover, it is likely that retention of the powder/granular material occurs on a return side of the rotating disc, or if filling of the powder/granular material in the powder/granular-material discharge groove is not sufficient, supply accuracy might be affected.

The present invention has an object to provide a metering feeder which realizes highly accurate supply of a powder/granular material by providing a vertically-movable scraper for large supply and a fixed small scraper for small supply and by enabling the small supply of the powder/granular material only by the fixed small scraper in the small supply.

Moreover, the present invention has an object to provide a metering feeder which enables smooth metered supply by preventing retention of the powder/granular material by smoothly returning the powder/granular material of the rotating disc.

Moreover, the present invention has an object to provide a metering feeder with nigh filling efficiency of the powder/granular material after discharge by providing at recessed portion.

In order to achieve the above-described objects, the present invention is configured such that, in a metering feeder formed by inner and outer cylinders sharing a center line, a gap is provided between a bottom plate of the outer cylinder and a lower end of the inner cylinder, an annular transport space for a powder/granular material is provided between the inner and outer cylinders, an outer rotating ring provided along an inner periphery of the outer cylinder is connected to a tip end of a central rotating blade provided on an upright rotating shaft projected at a center part of the bottom plate, a plurality of outer rotating blades directed toward an inside are provided on the outer rotating ring, a rotating disc having an upper surface on the same plane as an upper surface of the bottom plate is provided, a powder/granular-material discharge groove concentric with the disc is formed on the upper surface of the rotating disc, the powder/granular-material discharge groove supports the rotating disc on a support machine frame so that it is disposed over an inside and outside of the outer cylinder, the powder/granular material in the annular transport space is metered by the outer rotating blade and supplied to the powder/granular-material discharge groove by rotating the central rotating blade and the rotating disc in the same direction, and the powder/granular material is transported to an outside of the outer cylinder by the powder/granular-material discharge groove, the metering feeder is characterized in that a discharge opening is provided in the support machine frame on an outer side of the rotating disc outside the outer cylinder, and in the powder/granular-material discharge groove of the rotating disc, a vertically-movable scraper for large supply, fitted with the powder/granular-material discharge groove for small supply for blocking the powder/granular material in the powder/granular-material discharge groove and for guiding it to the discharge opening and a fixed small scraper for blocking a part of the powder/granular material in the discharge groove on a downstream side of the vertically-movable scraper and guiding it to the discharge opening are provided, the vertically-movable scraper being made capable of elevating between a lowered position fitted in the powder/granular-material discharge groove by elevating driving means and a raised position away from the powder/granular-material discharge groove.

By configuring as above, in the batch type metered supply operation, the central rotating blade and the rotating disc are rotated together, the powder/granular material is discharged while the vertically-movable scraper is positioned at the lowered position in the large supply, and when a predetermined amount of the powder/granular material has been discharged, the vertically-movable scraper is raised and then, a small supply operation is performed by the fixed small scraper, and when a target value is reached, the central rotating blade and the rotating disc are stopped so that a metered supply of the powder/granular material can be performed extremely accurately.

The fixed small scraper has a block portion located in the powder/granular-material discharge groove on its lower end portion and blocking a part of the powder/granular material and it is detachably provided on a scraper support portion fixed to the support machine frame, and the fixed small scraper may be provided capable of being replaced with another fixed small scraper having a block portion with a different area in the scraper support portion.

By configuring as above, the fixed small scrapers with different block portion areas can be used depending on a nature or a metered amount of the powder/granular material, and an extremely wide range of batch metering can be handled.

Outside the outer cylinder, it may be so configured that, on a downstream side of the fixed small scraper in the powder/granular-material discharge groove of the rotating disc, a loosening rod having a loosening portion for the powder/granular material on a lower end is inserted into and fixed to the powder/granular-material discharge groove from an upper surface side of the powder/granular-material discharge groove, and an upward groove is provided on a lower surface of the outer cylinder at a position where the powder/granular-material discharge groove on a return side of the rotating disc passes so that the powder/granular material loosened by the loosening rod returns from the upward groove into the annular transport space.

By configuring as above, the powder/granular material on the return side in the rotating disc can be smoothly returned to the annular transport space side, and retention of the powder/granular material on the return side can be effectively prevented.

It may be so configured that, on an outer peripheral surface of the outer rotating ring, a plurality of projections close to the inner periphery of the outer cylinder are provided, a plurality of return spaces of the powder/granular material are formed between the adjacent projections, and the powder/granular material returning into the annular transport space is filled in the return space through the upward groove and is made capable of being transported to a downstream side of the annular transport space by rotation of the central rotating blade.

By configuring as above, the powder/granular material having returned from the rotating disc to the annular transport space side can be filled in the return space in the outer rotating ring and transported smoothly to the downstream side, retention of the powder/granular material on the return side can be prevented, and each projection levels the powder/granular material in the powder/granular-material discharge groove of the rotating disc, whereby filling efficiency can be improved.

It may be so configured that, by hollowing out a ring shape in an inner surface on an outer periphery side of the powder/granular-material discharge groove of the rotating disc, a recessed portion made of a ring-shaped small groove having a certain width is formed and configured such that the vertically-movable scraper is not located in the recessed portion in lowering of the vertically-movable scraper, but only the powder/granular material in the recessed portion passes the vertically-movable scraper and is transported to the downstream side, the fixed small scraper is configured such that the powder/granular material located on an upper side from the powder/granular material of the recessed portion is discharged, whereby the powder/granular material in the recessed portion is not discharged but remains, and the powder/granular material to be subsequently discharged onto the powder/granular material in the recessed portion is filled on the downstream side from the fixed small scraper.

By configuring as above, since the powder/granular material to be newly discharged is filled on the powder/granular material remaining in the recessed portion, the powder/granular material into the powder/granular-material discharge groove on the return side can be easily filled, whereby filling efficiency of the powder/granular material can be improved.

Since the present invention is configured as above, in the batch type metered supply operation, the powder/granular material is discharged while the vertically-movable scraper is positioned at the lowered position in the large supply, and when a predetermined amount of the powder/granular material has been discharged, the vertically-movable scraper is raised and then, the small supply operation is performed by the fixed small scraper, and when the target value is reached, an operation such as stop of the central rotating blade and the rotating disc can be performed so that a metered supply of the powder/granular material can be performed extremely accurately.

Moreover, the fixed small scrapers with different block portion areas can be used depending on the nature or the metered amount of the powder/granular material, and an extremely wide range of batch metering can be handled.

Moreover, the powder/granular material on the return side in the rotating disc can be smoothly returned to the annular transport space, and retention of the powder/granular material on the return side can be effectively prevented.

Moreover, the powder/granular material having been returned from the rotating disc to the annular transport space side can be filled in the return space on the outer rotating ring and can be smoothly transported to the downstream side, whereby retention of the powder/granular material on the return side can be prevented, and each of the projections can level the powder/granular material in the powder/granular-material discharge groove of the rotating disc, whereby filling efficiency can be improved.

Moreover, since the powder/granular material to be newly discharged is filled on the powder/granular material remaining in the recessed portion, the powder/granular material can be easily filled into the powder/granular-material discharge groove on the return side, whereby filing efficiency of the powder/granular material can be improved.

BRIEF DESCRIPTION OF THE DRAWINGS

FIG. 16A is an enlarged sectional view of a vicinity of a recessed portion of the rotating disc of the metering feeder, and FIG. 16B is an enlarged sectional view of the rotating disc in which the recessed portion is not present.

DESCRIPTION OF THE PREFERRED EMBODIMENTS

A metering feeder according to the present invention will be described below in detail.

Figure 1:
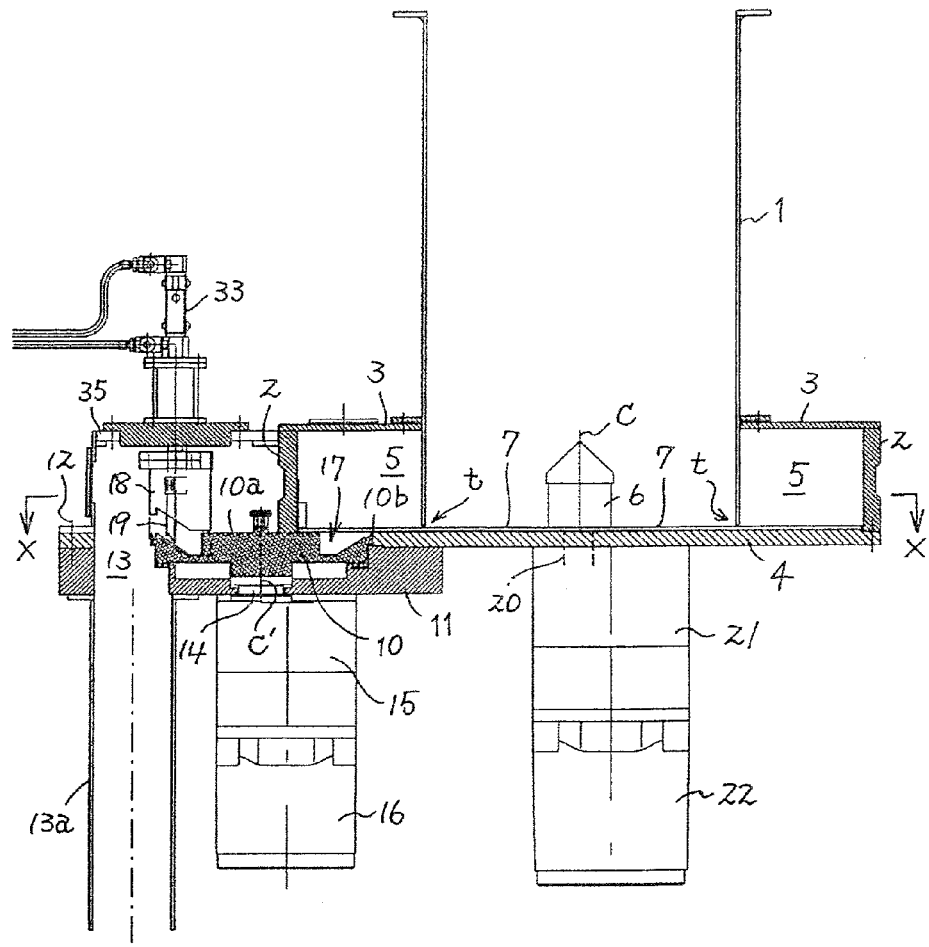
FIG. 1 is a side sectional view of a metering feeder according to the present invention.
Figure 2:
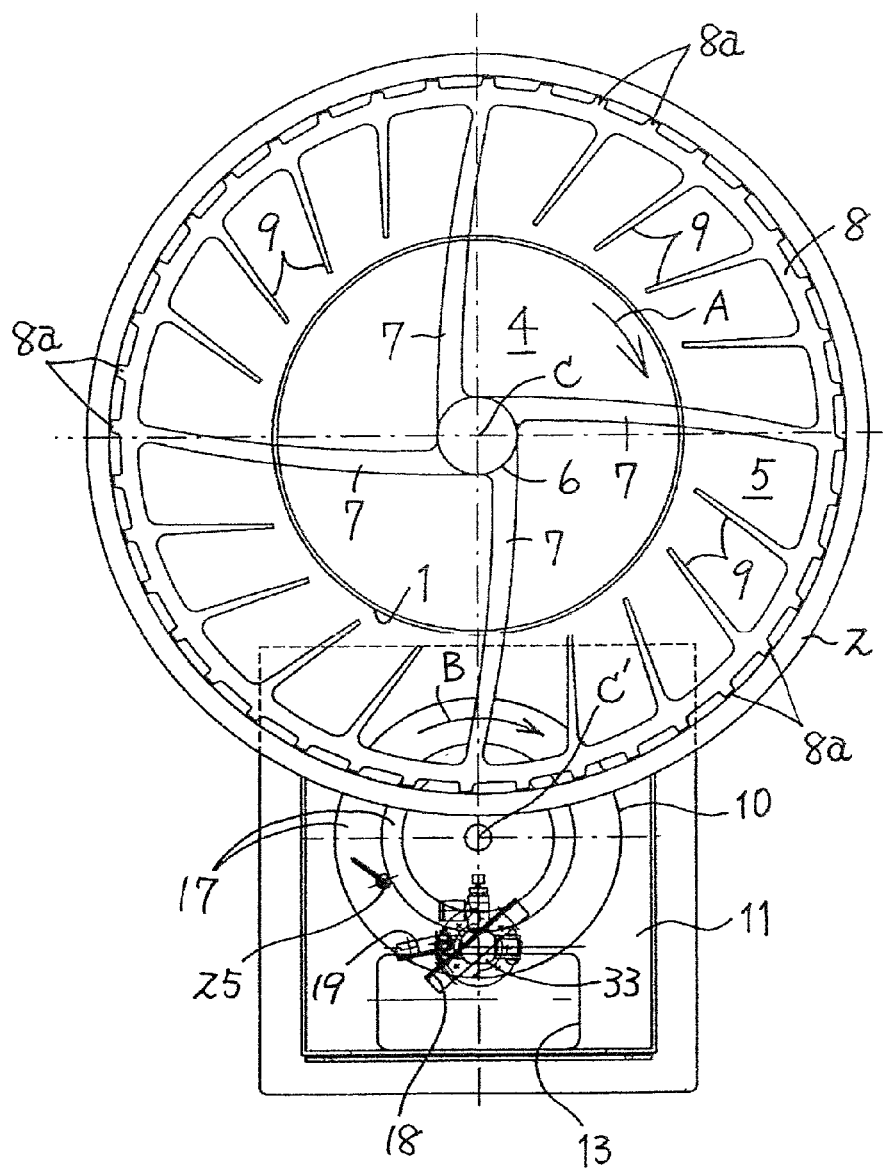
FIG. 2 is an X-X line sectional view of FIG. 1.

As illustrated, in FIGS. 1 and 2, upright circular inner and outer cylinders 1 and 2 sharing a center line C are provided integrally by a flange 3, and a bottom plate 4 is provided on the outer cylinder 2. A slight gap t is interposed between this bottom plate 4 and a lower end of the inner cylinder 1, an annular transport space 5 for a powder/granular material is formed between the inner and outer cylinders 1 and 2, and an upper end of an upright rotating shaft 6 is projected on the center line C of true bottom plate 4.

Base portions of a plurality (four pieces) of spoke-shaped central rotating blades 7 in contact with an upper surface of the bottom plate 4 are provided on the upright rotating shaft 6, a tip end of the rotating blade 7 is connected to an outer rotating ring 8 close to an inner peripheral surface of the outer cylinder 2 through the gap t, and a plurality of short outer rotating blades 9 in contact with the upper surface of the bottom plate 4 and directed toward an inside are provided on the ring 8 (see FIG. 2). As described above, the central rotating blade can be constituted by the spoke-shaped central rotating blade 7, for example.

On an outer periphery of the rotating ring 3, a plurality of projections 8a close to the inner peripheral surface of the outer cylinder 2 through an extremely slight gap is provided at an interval of a certain angle so that an upper surface of a powder/granular material e having returned by a rotating disc 10 which will be described later can be leveled.

A driving shaft 20 is provided on a lower part of the upright rotating shaft 6 of the bottom plate 4, a variable speed motor 22 by an inverter or the like is provided on the driving shaft 20 through a speed reducer 21, and the spoke-shaped central rotating blade 7 is made rotatable by the variable speed motor 22 horizontally in an arrow A direction.

On the bottom plate 4 constituted as above, the rotating disc 10 having an upper surface 10a on the same plane with the upper surface thereof or an upper end 10b of the outer periphery and extending over the inside and outside of the outer cylinder 2 is provided, a rectangular support device 11 supporting the rotating disc 10 at a position in the same plane rotatably on an outer peripheral side of the disc 10 is joined to a lower surface of the bottom plate 4 by a bolt 12, and a rectangular discharge opening 13 is opened on an outer side (the side opposite to the inner cylinder 1) of the device 11. To this discharge opening 13, a discharge chute 13a is connected downwardly as illustrated in FIG. 1. As described above, a support machine frame can be constituted by the rectangular support device 11, for example.

This support device 11 has the driving shaft 14 on the lower part of the rotating disc 10 as illustrated in FIG. 1, rotates the rotating disc 10 around the driving shaft 14 (rotation center C') horizontally in an arrow B direction and has a variable speed motor 16 by an inverter or the like provided through a speed reducer 15. A rotating direction (arrow A direction) of the central rotating blade 7 and a rotation direction (arrow B direction) of the rotating disc 10 are assumed to be the "same direction" with respect to each of the rotation centers C and C'. Therefore, in rotation in this "same direction", the rotating directions of the central rotating blade 7 and the rotating disc 10 are "opposite directions" in an overlapped part between the central rotating blade 7 and the rotating disc 10.

Figure 3:
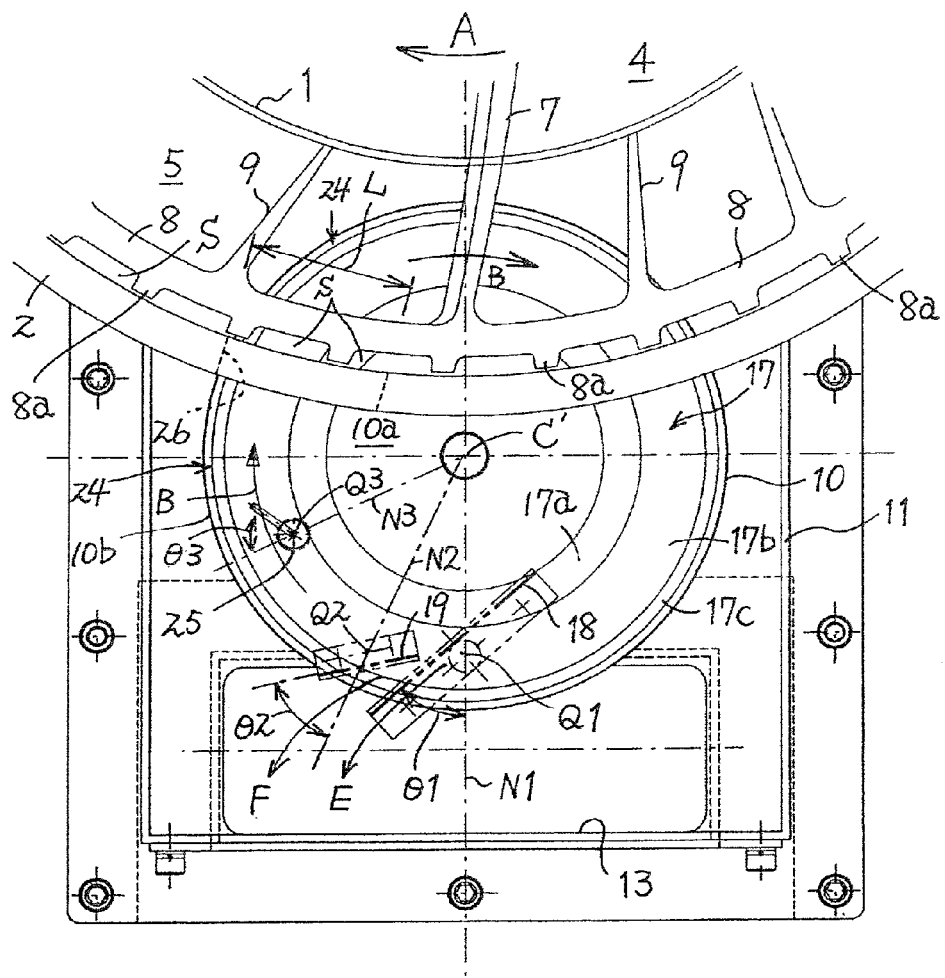
FIG. 3 is a cross sectional view of a vicinity of a rotating disc of the metering feeder.
Figure 4:
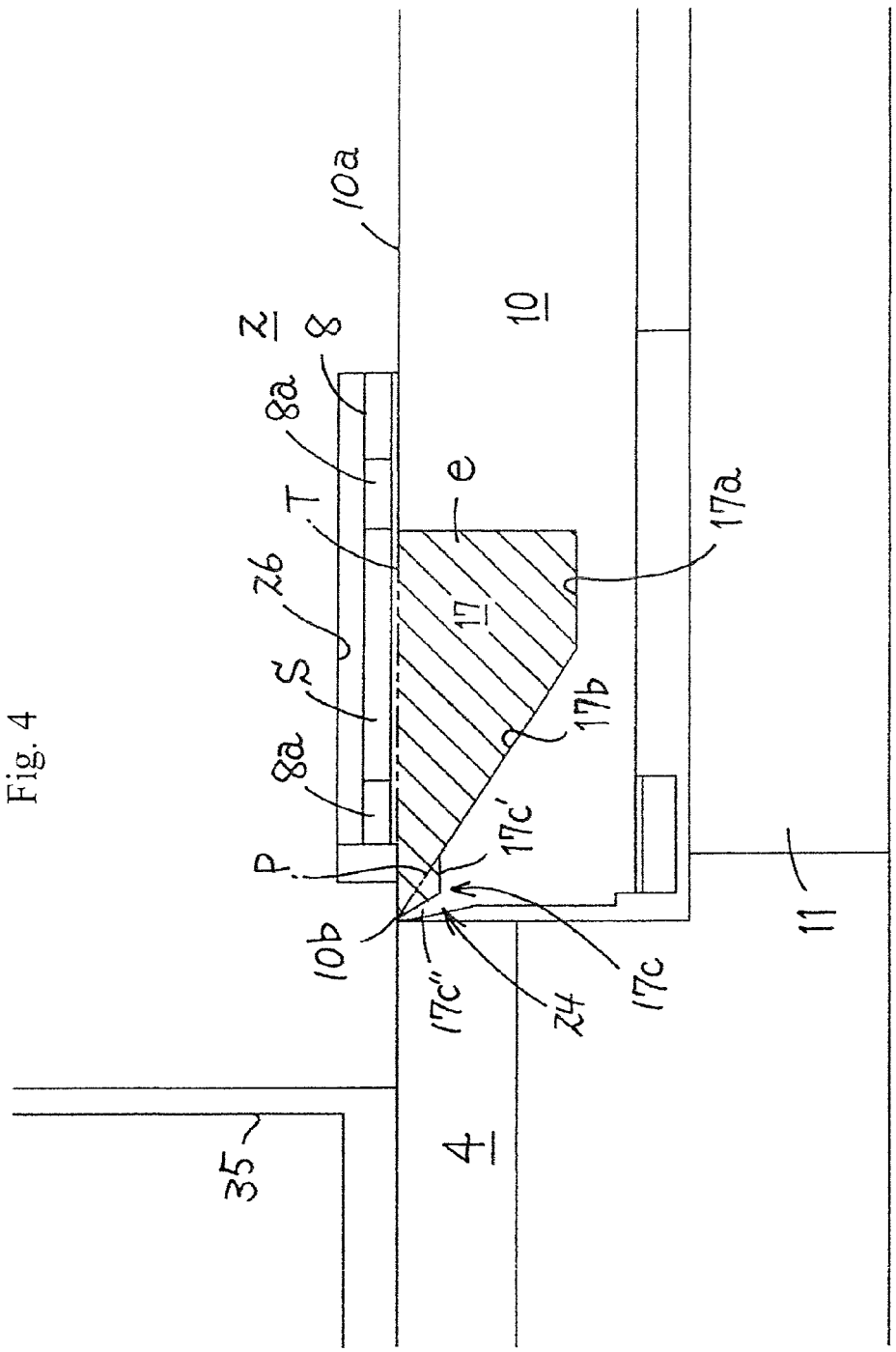
FIG. 4 is an enlarged sectional view of the vicinity of the rotating disc of the metering feeder.
Figure 5:
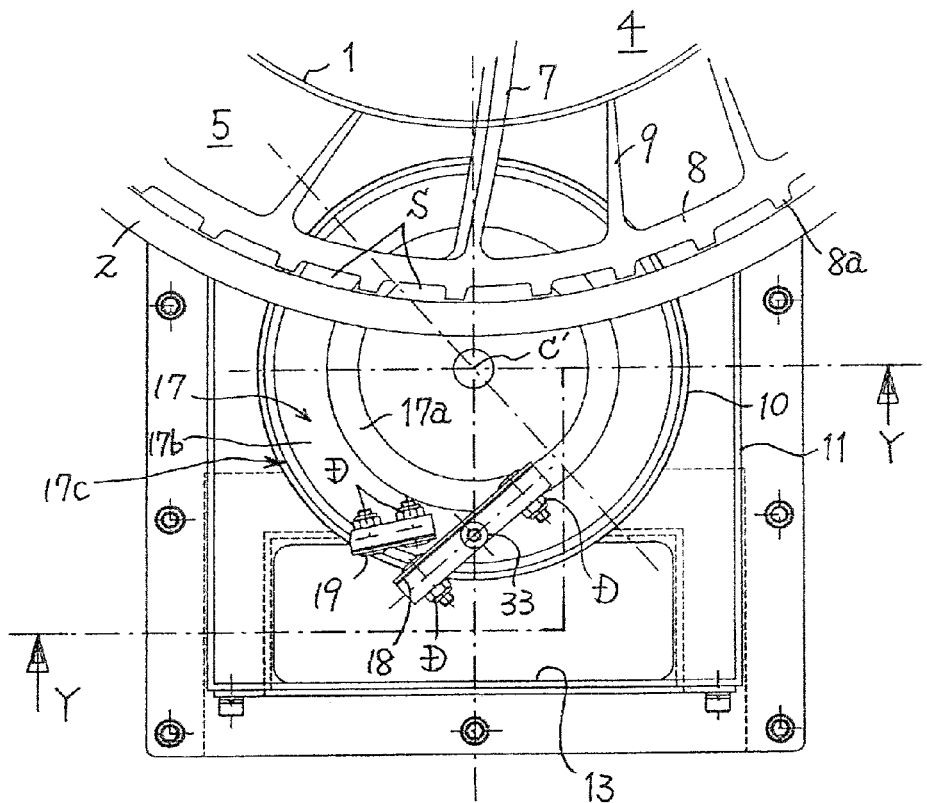
FIG. 5 is an enlarged sectional view of the vicinity of the rotating disc of the metering feeder.

In the upper surface of the rotating disc 10, a ring-shaped powder/granular-material discharge groove 17 having a recessed shape concentric with the disc 10 is formed, and as its vertical section, the one illustrated in FIG. 4, for example, is used. That is, the vertical section is composed of a bottom surface 17a on an innermost peripheral side forming the bottom of the powder/granular-material discharge groove 17, an inclined portion 17b forming an inclined surface inclined linearly upward from an outer peripheral edge of the bottom surface 17a toward the upper end 10b of the outer periphery of the rotating disc 10, and a recessed portion 17c constituted so as to hollow out a surface (inner surface) of the inclined portion 17b downward on a certain width on an inner peripheral side from the upper end 10b forming an outermost peripheral edge of the rotating disc 10 (see FIG. 3).

That is, by hollowing out a ring shape in the inner surface on the outer peripheral side of the powder/granular-material discharge groove 17 of the rotating disc 10, the recessed portion 17c made of a small groove 24 having a ring shape (concentric with the rotating disc) with a certain width is formed.

Then, the powder/granular material supplied into the inner cylinder flows out into the annular transport space 5 from the gap t by rotation of the rotating blade 7, conveyed by the central rotating blade 7 and the outer rotating blade 9 in an arrow h direction in the space 5, dropped and supplied into the powder/granular-material discharge groove 17 of the disc 10 at a portion of the rotating disc 10, filled and supplied into the discharge groove 17 by the rotation of the rotating disc 10 in an arrow B direction in a state in which the upper surface thereof is scraped by the lower surface of the outer cylinder 2 and the outer rotating blade 9, and enters a state in which the powder/granular material e is filled and supplied closely to a position T at the same level with the upper surface 10a of the rotating disc 10 as illustrated by hatching in FIG. 4 and FIG. 10B in the powder/granular-material discharge groove 17 going out of the outer cylinder 2.

Here, the position of the lower surface of the outer cylinder 2, the upper surface 10a of the rotating disc 10, and the position of the upper end 10b axe on substantially the same level, and the lower surfaces of the outer rotating ring 8, the projection 8a, and the outer rotating blade 9 are on substantially the same level position as the upper surface 10a and the upper end 10b.

The recessed portion 17c is made of, as illustrated in FIG. 4, a horizontal portion 17c' formed in an outer peripheral direction from the position of the inclined portion 17b on the outer peripheral side and an inclined portion 17c″ forming a steep upward inclined surface from the horizontal portion 17c′ toward the upper end 10b and is formed so as to constitute a ring-shaped small groove 24 having a substantially triangular vertical section by a virtual line P connecting the inclined portion 17b and the upper end 10b or the vicinity of the upper end 10b, the horizontal portion 17c′, and the inclined portion 17c″.

Here, an upstream side and a downstream side are defined on the basis of the rotating directions of the spoke-shaped central rotating blade 7 and the rotating disc 10. Moreover, an area from after discharge of the powder/granular material to the discharge opening 13 a fixed small scraper 19 in the rotating disc 10 to the annular transport space 5 is referred to as a return side.

On an outer side of the outer cylinder 2, a vertically-movable scraper 18 for large quantity discharge (for large supply) of the powder/granular material to be inserted into the groove 17 is provided at a position corresponding to the discharge opening 13 and the fixed small scraper 19 for small quantity discharge (for small supply) of the powder/granular material is provided on the downstream side of the vertically-movable scraper 18, and it is configured such that, by inserting these scrapers 18 and 19 into the groove 17, the powder/granular material e in the groove 17 can be guided and discharged into the discharge opening 13 (see arrows E and F in FIG. 3).

Figure 9:
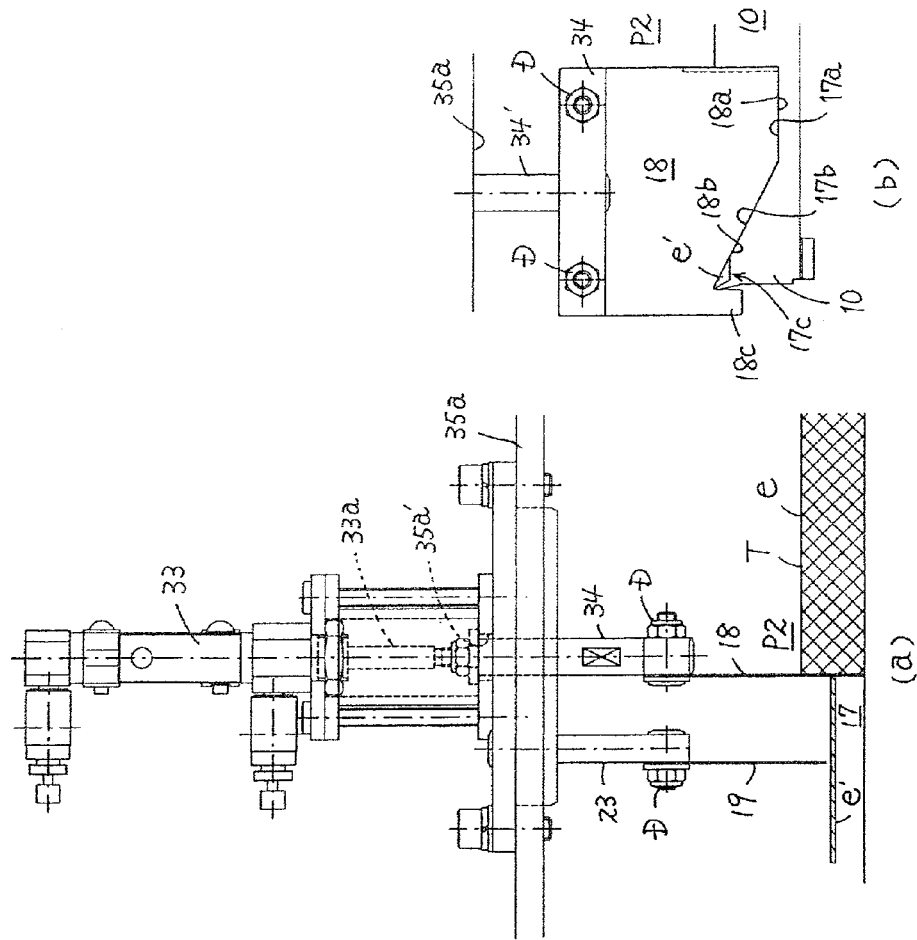
FIG. 9A is a side view of a vicinity of a scraper of the metering feeder.
FIG. 9B is a side view of a vicinity of a vertically-movable scraper.

The vertically-movable scraper 18 is made of a plate shaped body with a small plate thickness as illustrated in FIGS. 9A and 9B, and its lower edge has a shape fitted with a vertical sectional shape of the powder/granular-material discharge groove 17 when it is inserted into the powder/granular-material discharge groove 17 with diagonal inclination in a direction of the discharge opening 13 from the upstream side toward the downstream side as illustrated in FIG. 3, that is, has a horizontal portion 18a fitted with the bottom surface 17a and an inclined portion 18b fitted with the inclined portion 17b as illustrated in FIG. 9B, and an engagement portion 18c to be engaged with the outer peripheral surface side of the rotating disc 10 for positioning the scraper 18 with respect to the rotating disc 10 is formed downward on an upper end portion of the inclined portion 18b. Since the inclined portion 18b of the scraper 18 is in a linear state, when the scraper 18 is fitted with the powder/granular-material discharge groove 17, the recessed portion 17c is in a state in which a space is formed. That is, when the vertically-movable scraper 18 is lowered, it is configured such that the vertically-movable scraper 18 is not located in the recessed portion 17c but only a powder/granular material e′ in the recessed portion 17c passes the vertically-movable scraper 18 and is transported to the downstream side.

An inclination angle of the vertically-movable scraper 18 is in a state in which an end portion on the discharge opening 13 side is inclined toward the downstream side by an angle of θ1 degrees around a center Q1 with respect to a radius line N1 in its width direction and a surface for blocking the powder/granular material is directed toward the discharge opening 13 side as illustrated in FIG. 3.

This vertically-movable scraper 18 (see FIG. 9) is fixed to the support portion 34 by bolts D and D vertically downward. A support rod 34′ is connected and fixed to an upper edge of the support portion 34, an upper end portion of the support rod 34′ is located on an upper surface side of a housing 35 through an opening 35a′ formed in an upper surface plate 35a of the housing 35 covering an upper part of the rectangular support device 11, and an upper end portion of the support rod 34′ at this position is connected to a vertical elevating driving shaft 33a of an air cylinder 33 fixed vertically to the upper surface plate 35a. As described above, the elevating driving means can be constituted by the support portion 34, the support rod 34′, the vertical elevating driving shaft 33a, the air cylinder 33 and the like.

Figure 6:
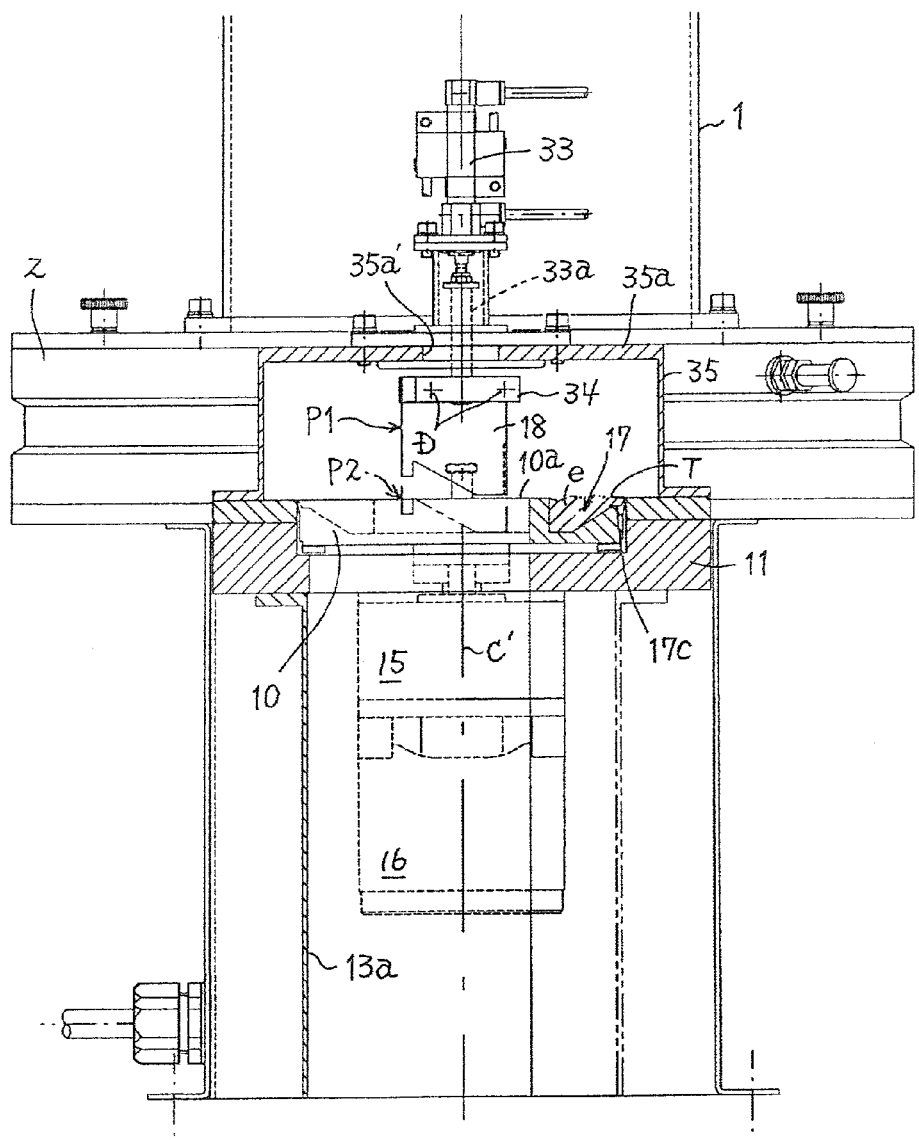
FIG. 6 is a Y-Y line sectional view of FIG. 5.
Figure 7:
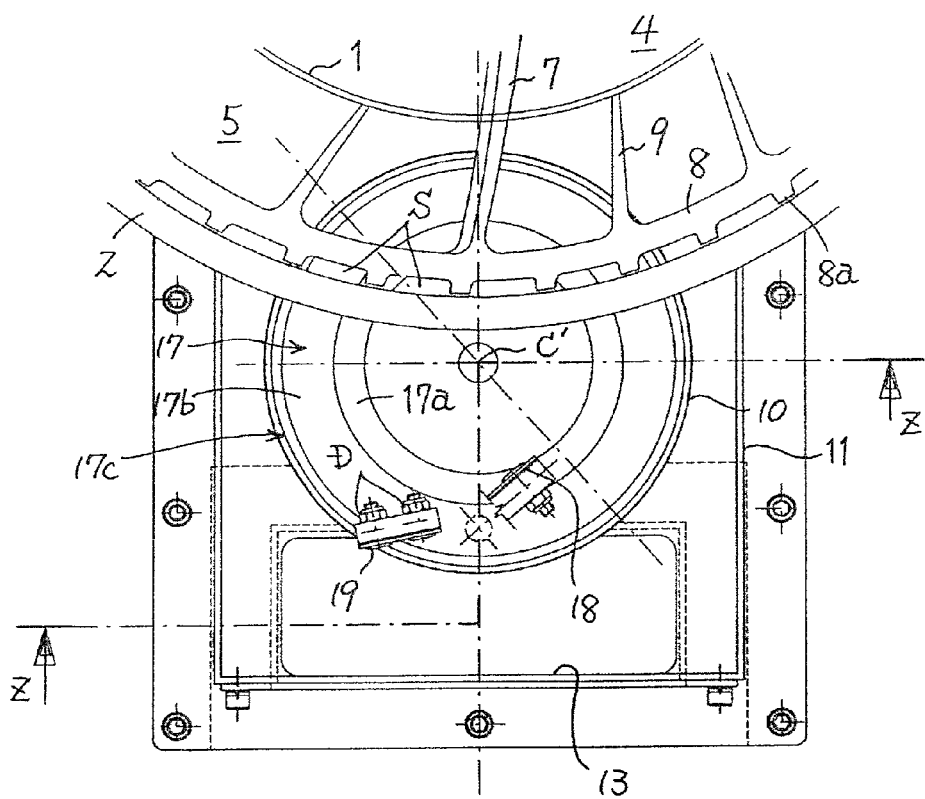
FIG. 7 is an enlarged sectional view of the vicinity of the rotating disc of the metering feeder.
Figure 8:
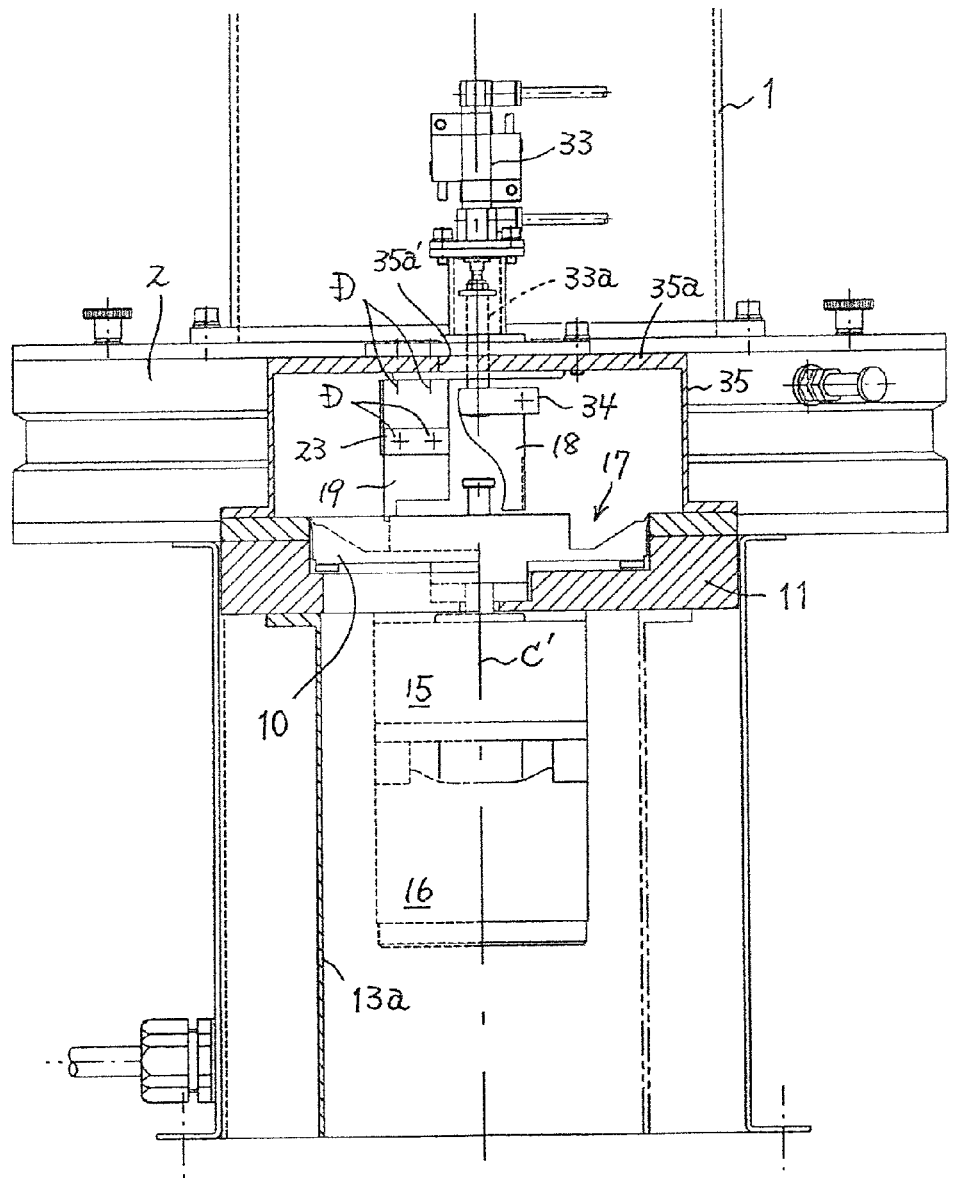
FIG. 8 is a Z-Z line sectional view of FIG. 7.

When the elevating driving shaft 33a of the air cylinder 33 is raised, the scraper 18 is located at a raised position P1 (position in FIG. 10A) in FIG. 6, that is, at the raised position P1 where a lower end of the scraper 18 is located above the upper surface 10a of the rotating disc 10. That is, the position is separated upward away from the powder/granular-material discharge groove 17.

When the elevating driving shaft 33a of the air cylinder 33 is lowered, the scraper 18 is configured to be located at a lowered position P2 in FIG. 6, that is, in a state in which the horizontal portion 18a and the inclined portion 18b of the scraper 18 are fitted with the bottom surface 17a and the inclined portion 17b of the powder/granular-material discharge groove 17 (states in FIGS. 9A and 9B).

Therefore, the scraper 18 does not discharge the powder/granular material e supplied to the powder/granular-material discharge groove 17 at the raised position P1 (see FIG. 10), while at the lowered position P2 (see FIG. 9), the scraper 18 is fitted with the powder/granular-material discharge groove 17 to the bottom surface 17a so as to close the discharge groove 17, whereby the powder/granular material e supplied to the discharge groove 17 is guided by the scraper 18 to the direction of the rectangular discharge opening 13 and is discharged to the discharge opening 13 (see the arrow E in FIG. 3). As described above, the discharge opening can be constituted by the rectangular discharge opening 13.

At this time, since the vertically-movable scraper 18 is not located in the recessed portion 17c, the powder/granular material e′ remains in the recessed portion 17c (see FIGS. 9B and 13) and moves (passes) to the downstream side as it is with the rotation of the rotating disc 10.

Figure 10:
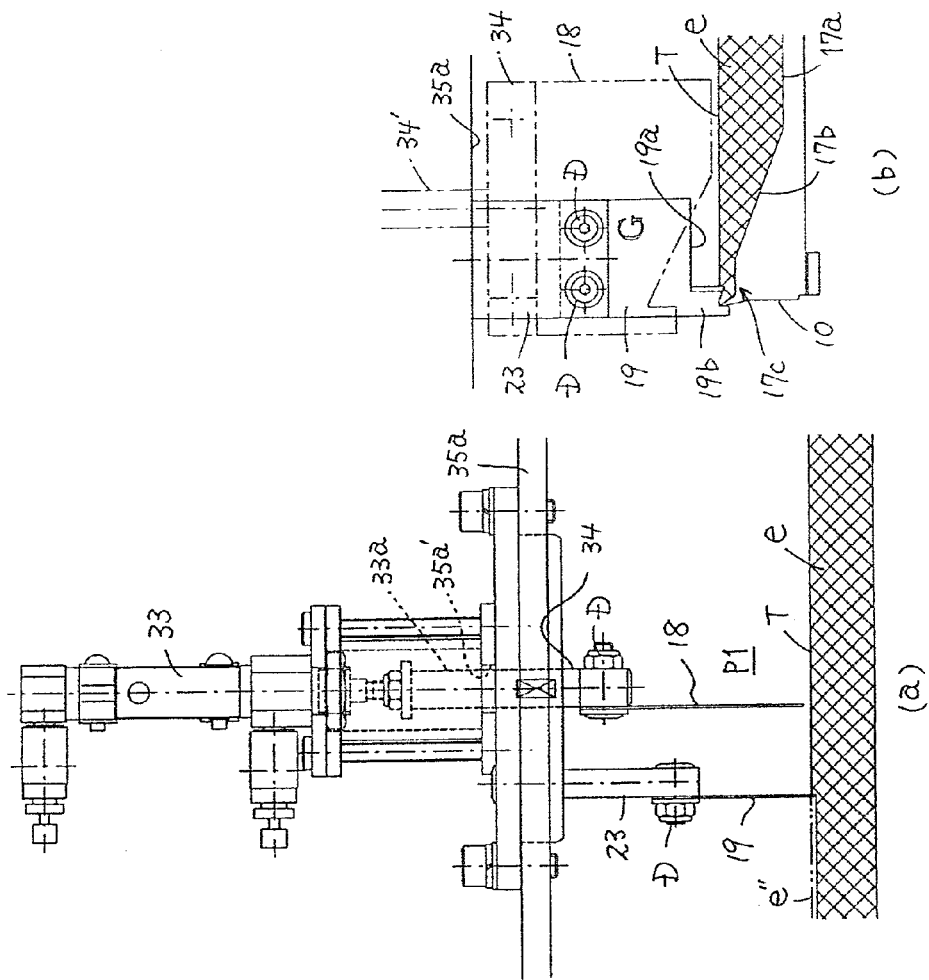
FIG. 10A is a side view of the vicinity of the scraper of the metering feeder.
FIG. 10B is a side view of a vicinity of a fixed small scraper.

The fixed small scraper 19 is constituted by a thin plate shaped body similar to the vertically-movable scraper 13 as illustrated in FIG. 10, and is provided with inclination toward the discharge opening 13 side to the downstream side from the upstream side of the powder/granular material on the downstream side of the vertically-movable scraper 18 as illustrated in FIG. 3. This fixed small scraper 19 is fixed to a scraper support portion 23 vertically downward by the bolts D and D, and the scraper support portion 23 has its upper end fixed to the upper surface plate 35a of the housing 35 (support machine frame) by the bolts D and D.

Figure 11:
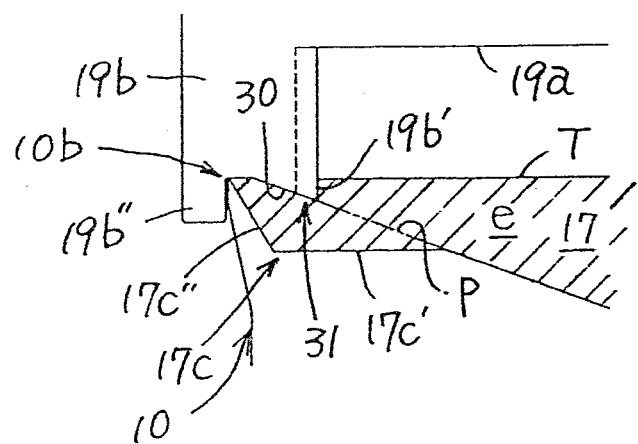
FIG. 11 is an enlarged view of the vicinity of the fixed small scraper to FIG. 10B.

This fixed small scraper 19 has its lower end constituted by a horizontal portion 19a and a downward projecting portion 19b provided on an outer side of the horizontal portion 19a as illustrated in FIG. 10B, and the downward projecting portion 19b is located in correspondence with the recessed portion 17c and is constituted by a powder/granular-material block plate portion 19b′ slightly going into the powder/granular-material discharge groove 17 from the position T at the level for the upper end 10b of the rotating disc 10 and an engagement portion 19b″ engaged with the outer peripheral surface of the rotating disc 10 as illustrated in FIG. 11.

The powder/granular-material block plate portion 19b′ of the downward projecting portion 19b forms a substantially triangular block portion 31 in which an upward inclined surface 30 is formed in a direction of the engagement portion 19b″ from a lowest end on a side of the horizontal portion 19a, and in the block portion 31, a part of the powder/granular material in the powder/granular-material discharge groove 17, moving in the arrow B direction, is blocked, and a small amount of the blocked powder/granular material is guided and discharged to the direction of the discharge opening 13 (see the arrow F in FIG. 3). Moreover, the inclined surface 30 is provided along the virtual line F on the recessed portion 17c.

Figure 14:
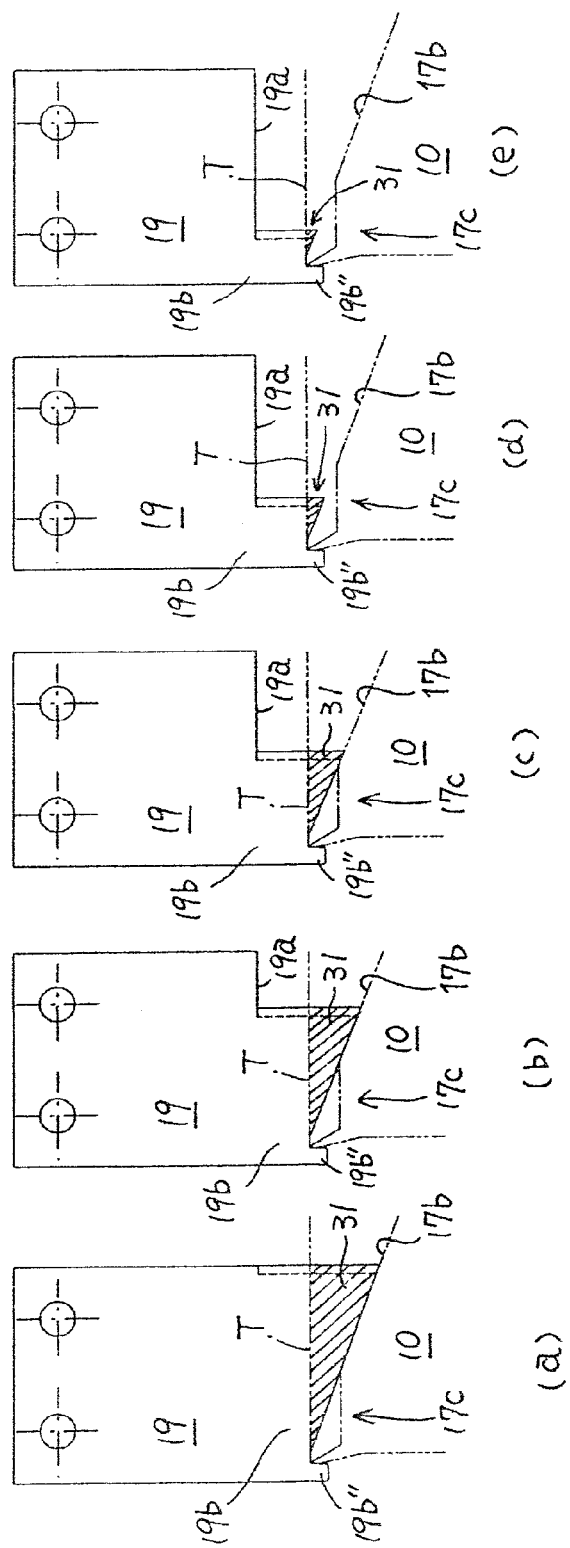
FIG. 14A to 14E illustrate the fixed small scraper used in the metering feeder.

Regarding this fixed small scraper 19, those having various shapes as illustrated in FIGS. 14A to 14E can be used by replacement, and any one of them indicates an upper surface level of the powder/granular material e in the powder/granular-material discharge groove 17 of the rotating disc 10 at the position T in the figure. Therefore, the powder/granular material can be blocked by the powder/granular-material block plate portion 19b' (block portion 31) located below the position T and guided to the direction of the discharge opening 13. Specifically, a portion indicated by hatching in FIG. 14 is the block portion 31 capable of discharging the powder/granular material, and from the scraper 19 having the block portion 31 with the smallest area in FIG. 14E to the scraper 19 having the block portion 31 with the largest area in FIG. 14A are illustrated in order of the area of the block portion 31 from the smallest to the largest. Any one of the block portions 31 is located above the recessed portion 17c and is configured so that the powder/granular material located above the powder/granular material in the recessed portion 17c is discharged and the powder/granular material in the recessed portion 17c remains without being discharged. The fixed small scraper 19 in FIG. 14A does not have the horizontal portion 19a but has the block portion 31 formed to the other end.

The fixed small scraper 19 is detachably provided by the bolt D on the scraper support portion 23 fixed to the housing 35, and the fixed small scraper 19 can be replaced with another fixed small scraper 19 having the block portion 31 with a different area in the scraper support portion 23.

In the batch type metering, regarding this fixed small scraper 19, a large quantity of the powder/granular material is guided by the vertically-movable scraper 18 to the discharge opening 13 in the large supply, and the vertically-movable scraper 18 is raised to the raised position P1 in the small supply stage and then, the small amount of the powder/granular material (the powder/granular material e" in FIGS. 10A and 16A, the small amount of the powder/granular material corresponding to the area of the block portion 31 (a part of the powder/granular material)) is discharged by the block portion 31 of the fixed small scraper 19 so that metering accuracy of the batch metering is improved. As illustrated in FIGS. 14A to 14E, the amount of the small supply can be adjusted by the area of the powder/granular-material block plate portion 19b' (block portion 31) of the fixed small scraper 19 such that the small supply in the smallest amount can be made by the fixed small scraper 19 in FIG. 14E and the small supply in the largest amount can be made by the fixed small scraper 19 in FIG. 14A.

The inclination angle of the fixed small scraper 19 is in a state in which the end portion on the discharge opening 13 side is inclined toward the downstream side by an angle of θ2 degrees around a center Q2 with respect to a radius line N2 in its width direction and a surface for blocking the powder/granular material is directed toward the discharge opening 13 side as illustrated in FIG. 3.

Figure 12:
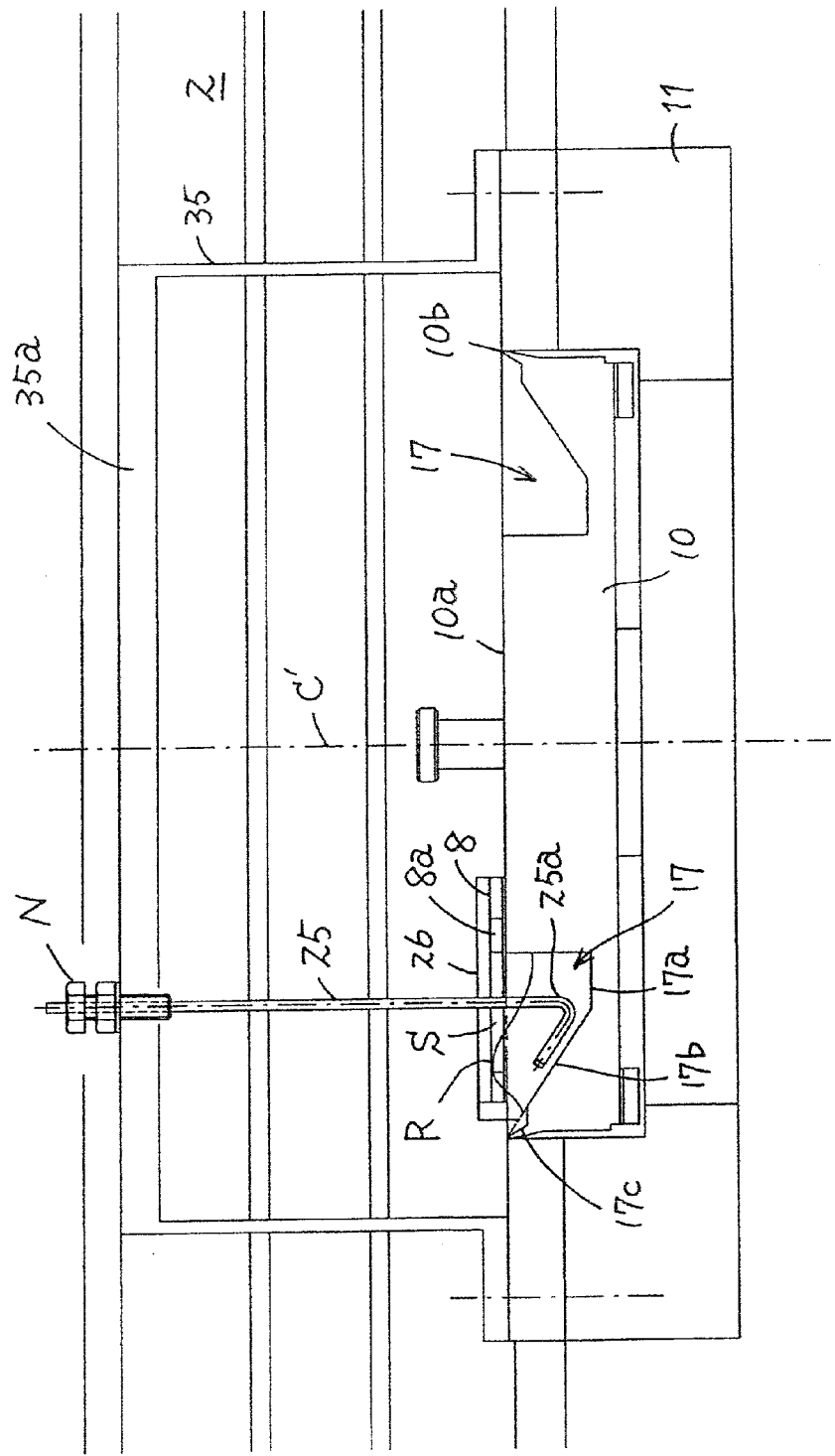
FIG. 12 is a sectional view of a vicinity of a loosening rod of the metering feeder.

A loosening rod 25 is provided on the downstream side from the fixed small scraper 19 in the powder/granular-material discharge groove 17 of the rotating disc 10. This loosening rod 25 is formed of a rod-shaped member, has its upper end portion retained and fixed by a nut N on the upper surface plate 35a of the housing 35 as illustrated in FIG. 12, while the lower end portion thereof is linearly extended vertically downward to the vicinity of the bottom surface 17a of the discharge groove 17, and the loosening portion 25a having a J-shape bent upward along the inclination portion 17b of the discharge groove 17 is formed from the lower end portion. Moreover, as illustrated in FIG. 3, it is fixed in a state inclined to the downstream side by an angle of θ3 degrees around a center Q3 of the loosening rod 25 with respect to a radius line N3 on a plan view.

Figure 13:
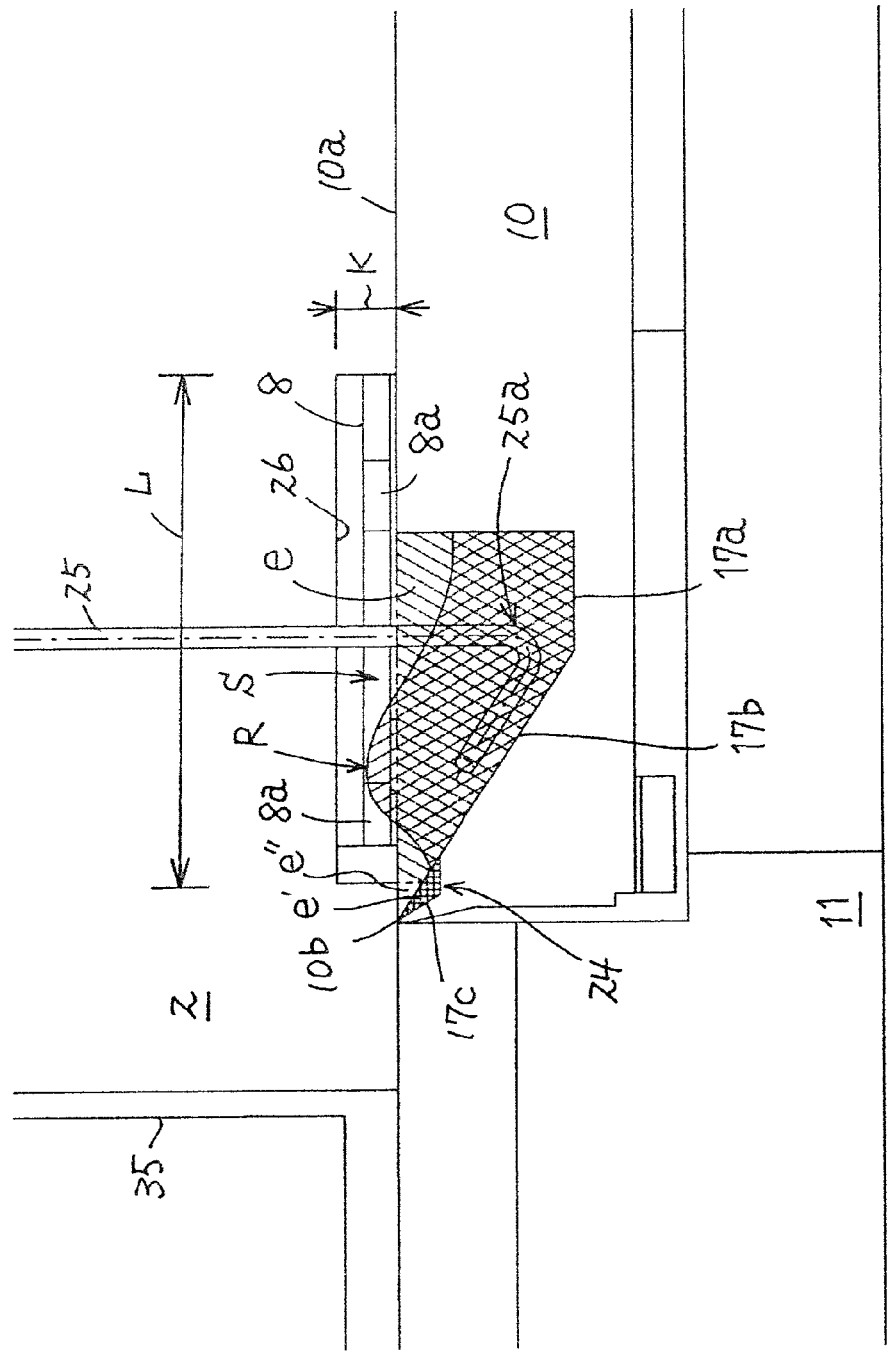
FIG. 13 is an enlarged view of the vicinity of the loosening rod in FIG. 12.

This loosening rod 25 has a function of loosening the powder/granular material remaining in the powder/granular-material discharge groove 17 with rotation of the rotating disc 10 and returning to the annular transport space 5 and it is configured such that the returning powder/granular material e is loosened by presence of the loosening rod 25 as illustrated in FIG. 13 so as to form a raised portion R, whereby the powder/granular material e' (hatched portion in FIG. 13) can be reliably filled in the portion of the small groove 24 in the recessed portion 17c (see FIG. 13).

On the lower surface of the outer cylinder 2 on the return side after the powder/granular material of the rotating disc 10 has been discharged, a gate-shaped upward groove 26 having a vertical width K and a width L in a circumferential direction within a range from the upper end 10b of the outer periphery of the rotating disc 10 to the upper surface 10a is provided (see FIGS. 3 and 13). This upward groove 26 is to enable smooth return of the powder/granular material forming the raised portion R raised by the loosening rod 25 into the outer cylinder 2 through the upward groove 26.

The powder/granular material e having returned into the annular transport space 5 through the upward groove 26 is filled in a return space S between the projection 8a of the outer rotating ring 8 and the projection 8a (see FIG. 3) and can be smoothly transported to the downstream side in the annular transport space 5 by rotation of the central rotating blade 7 in the arrow A direction, whereby retention of the powder/granular material on the return side in the vicinity of the upward groove 26 can be prevented, and the projection 8a is configured to be able to level the upper surface of the powder/granular material having returned into the powder/granular-material discharge groove 17.

Figure 15:
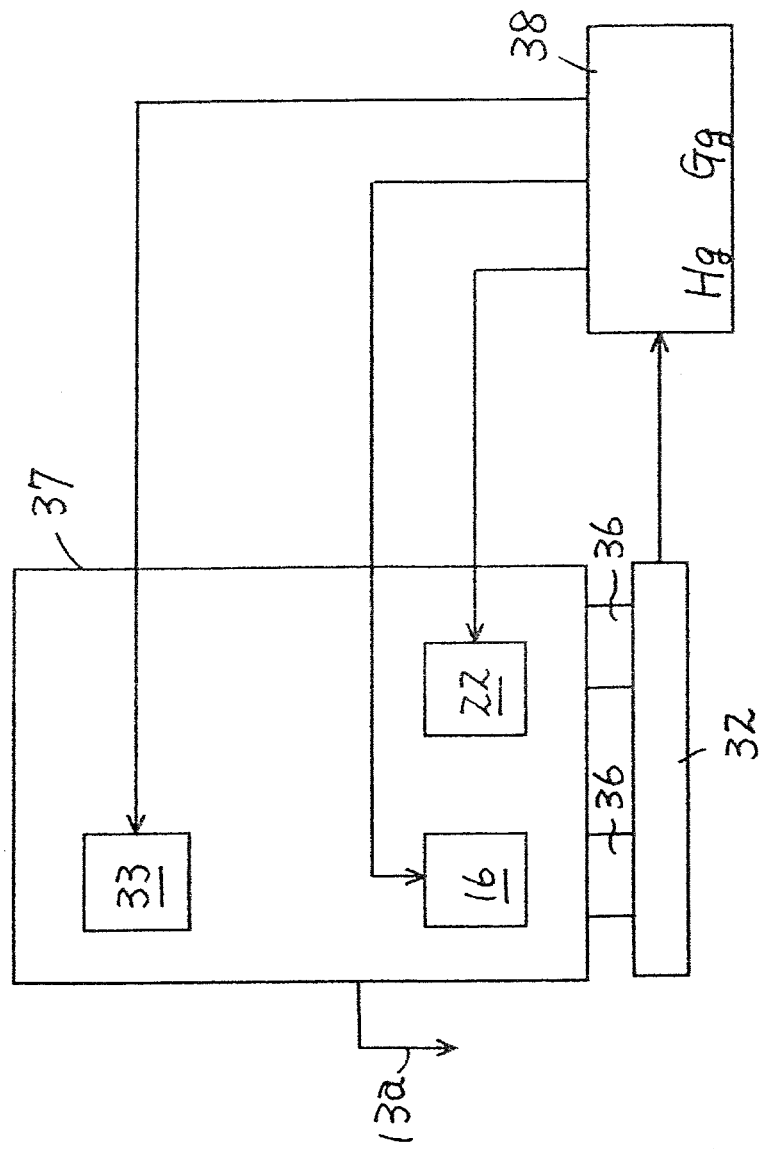
FIG. 15 is a block diagram illustrating an electric configuration of a control system in the metering feeder.

FIG. 15 is a block diagram illustrating an electric configuration of the metering feeder according to the present invention, in which reference numeral 37 denotes a metering feeder body, the body 37 being placed on a support base 32 through a column 36. This support base 32 has a function of a platform scale and is configured capable of metering a weight of the entire powder/granular material input into the inner cylinder 1. A controller 38 receives a metering signal which is a metered value of the platform scale at all times. In the controller 38, a target value Hg which is a metered value of the powder/granular material and a proximate value Gg (H>G) which is a metered value at timing when the large supply is changed to the small supply and is slightly smaller than the target value are set in advance in the batch type metering.

Then, the controller 38 drives the variable speed motors 22 and 16 at a certain speed in the large supply so as to rotate the central rotating blade 7 and the rotating disc 19 at a certain speed so as to discharge the powder/granular material from the discharge opening 13 through the discharge chute 13a in a state in which the air cylinder 33 is lowered and the vertically-movable scraper 18 is located at the lowered position P2.

The controller 38 recognizes the discharge amount of the powder/granular-material discharged from the discharge chute 13a as a metered value of the powder/granular material on the basis of the metering signal from the platform scale, and when it detects that the metered value reaches the proximate value Gg, it raises the air cylinder 33 and positions the vertically-movable scraper 18 to the raised position P1 and then, lowers the speed of the variable speed motor 16 (a certain speed at ½ to ⅓ of the speed in the large supply, for example), whereby the rotating speed of the rotating disc 10 is lowered and transition is made to the small supply operation, and the small supply operation is performed by the fixed small scraper 19. Alternatively, the small supply operation is performed by the fixed small scraper 19 at the same speed as that in the large supply without lowering the rotating speed of the rotating disc 10.

In the small supply operation, such control is configured to be executed that, when the metered value (discharge amount of the powder/granular material) has reached the target value Hg on the basis of the metering signal, rotation of the variable speed motors 16 and 22 is stopped.

Since the present invention is configured as described above, an operation of the metering feeder of the present invention will be described below. Here, it is assumed that the vertically-movable scraper 18 is first located at the lowered position P2, moreover, it is assumed that the powder/granular material is a powder/granular material such as "soybean flour" or the like, for example, and the batch type metering of the powder/granular material (target value Hg, proximate value Gg) is to be performed. An accommodating bag or the like for the powder/granular material is installed on a lower end of the discharge chute 13a of the discharge opening 13. It is also assumed that the fixed small scraper illustrated in FIG. 14E is used as the fixed small scraper 19.

First, the powder/granular material (powdery food material such as a soybean flour, for example) is accommodated in the inner cylinder 1. After that, the variable speed motor 22 is driven at the certain speed. Thus, the spoke-shaped central rotating blade 7 and the outer rotating blade 9 are rotated at the certain speed in the arrow A direction. At the same time, the variable speed motor 16 is driven at the certain speed. Thus, the rotating disc 10 is also rotated at the certain speed in the arrow B direction.

Then, the powder/granular material in the inner cylinder 1 flows out to the annular transport space 5 side from substantially the entire periphery of the gap t by rotation of the spoke-shaped central rotating blade 7, and the powder/granular material having flowed out to the annular transport space 5 is transported in the transport space 5 by the plurality of outer rotating blade 9 in the arrow A direction.

The powder/granular material is conveyed in the annular transport space 5 in the arrow A direction by an end edge of the cuter rotating blade 9 on a side of an advancing direction and at the position of the rotating disc 10, it is sequentially dropped and supplied into the powder/granular-material discharge groove 17 of the disc 10 from above the bottom surface 4.

Since the rotating disc 10 is rotating in the arrow B direction, the powder/granular material dropped and supplied into the powder/granular-material discharge groove 17 has its upper surface scraped by the edge of the outer rotating blade 9 on the advancing direction side and on the lower surface of the outer cylinder 2 by rotation in the arrow B direction and is transported to the outer side of the outer cylinder 2 in a state with the upper surface of the powder/granular material in the groove 17 horizontally scraped at the same level as the position T substantially the same as the upper surface 10a of the rotating disc 10.

That is, in the powder/granular-material discharge groove 17, the powder/granular material e is filled in each of the bottom surface 17a, the inclined portion 17b, and the recessed portion 17c, has the upper surface forming a horizontal surface at the position T, and is transported in the arrow B direction outside the outer cylinder 2 on the basis of the rotation of the rotating disc 10 in a state closely filled in the entire discharge groove 17 (see FIG. 4).

The powder/granular material remaining in the annular transport space 5 by being scraped in the space 5 is transported in the arrow A direction by the outer rotating blade 9 and is dropped and filled in the powder/granular-material discharge groove 17 on the return side after discharge of the powder/granular material of the rotating disc 10, and the remaining powder/granular material not filled in the discharge groove 17 repeats the operation of rotation and transport in the arrow A direction by the outer rotating blade 9 in the annular transport space 5, and the powder/granular material in the annular transport space 5 is not compacted.

Then, the powder/granular material having been transported by the rotating disc 10 to substantially the center part of the powder/granular-material discharge opening 13 is blocked by the plate surface of the vertically-movable scraper 18 arranged with inclination except the recessed portion 17c (see FIGS. 9A and 9B), and the blocked powder/granular material e flows out to the outside from inside the discharge groove 17 in the arrow E direction along the scraper 18, and thus, the powder/granular material e continuously flows out in the arrow E direction and is discharged to the outside from the powder/granular-material discharge opening 13 (large supply operation (see FIG. 3)).

Such operation is an operation in the "large supply", and the powder/granular material in the powder/granular-material discharge groove 17 blocked by the scraper 18 is discharged to the powder/granular-material discharge opening 13. At this time, the powder/granular material e′ in the small groove 24 in the recessed portion 17c is not discharged but passes as it is and is transported to the downstream side (see FIG. 9A). Moreover, there is no powder/granular material blocked by the fixed small scraper 19 at this time, and the loosening rod 25 is not functioning.

In this large supply operation, the controller 38 recognizes the discharge amount of the powder/granular material as the metered value on the basis of the metering signal from the platform scale, and when the metered value has reached the proximate value Gg, the controller 38 drives the air cylinder 33 so as to raise the vertically-movable scraper 18 to the raised position P1. At the same time, the controller 33 lowers the rotating speed of the variable speed motor 16 to a certain speed at ⅓, for example, and rotates the rotating disc 10 more slowly than that in the large supply.

Then, the powder/granular material e having been blocked by the vertically-movable scraper 18 is transported to the downstream side, and thus, the powder/granular material e in the state filled to the position T in the powder/granular-material discharge groove 17 is transported toward the fixed small scraper 19 on the downstream side (see FIGS. 10A and 10B).

Then, the powder/granular material having been transported from the position of the vertically-movable scraper 13 to the downstream side is blocked by the block portion 31 of the powder/granular material fixed small scraper 19, and a small amount of the powder/granular material e″ in the amount blocked by the block portion 31, that is, the powder/granular material e″ blocked in correspondence with the area of the block portion 31 is guided and discharged in the arrow F direction (see FIG. 10A) and is supplied and discharged into the discharge opening 13 along the arrow F (see FIG. 3).

At this time, the controller 38 recognizes the discharge amount of the powder/granular material as the metered value on the basis of the metering signal from the platform scale and detects whether or not the metered value has reached the target value Hg. Then, at a point of time when the metered value has reached the target value Hg, the controller 38 stops the variable speed motors 16 and 22.

As a result, an accurate amount (target value Hg) of the powder/granular material can be supplied to the discharge opening 13 and into the accommodating bag on the lower end of the discharge chute 13a. In the small supply operation, since the small amount of the powder/granular material can be discharged by the block portion 31 of the fixed small scraper 19 as described above, the "dripping" or the like of the powder/granular material does not occur even if the rotation of the rotating disc 10 is stopped, and accurate batch metering can be made.

The discharge amount of the powder/granular material in the small supply can be changed by replacing the fixed small scraper 19. That is, the discharge amount in the small supply is determined by the area of the block portion 31 of the fixed small scraper 19, and thus, by setting the various fixed small scrapers 19 on the support portion 23 as illustrated in FIG. 14, the discharge amount of the powder/granular material in the small supply can be changed, whereby a wide range of a metering operation can be performed. Specifically, the bolts D and D of the scraper support portion 23 are removed so as to remove the fixed small scraper 19, and another fixed small scraper 19 is fixed to the scraper support portion 23 by the bolts D and D.

In such small supply operation, the powder/granular material in the powder/granular-material discharge groove 17 other than the powder/granular-material e" (see FIG. 16A) blocked and discharged by the fixed small scraper 19 is further transported together with the powder/granular material e' remaining in the recessed portion 17c to the downstream side from the scraper 19, stirred by the loosening portion 25a at the lower end of the loosening rod 25, the raised portion R is formed by being loosened, and the powder/granular material is also filled onto the small groove 24 of the recessed portion 17c at the same time (see FIG. 13).

As described above, the powder/granular material e' is reliably filled in the upper part of the small groove 24 of the recessed portion 17c by the loosening rod 25, and when the rotating disc 10 is transported to the annular transport space 5, the powder/granular material e to be newly discharged can be reliably filled in the upper part of the powder/granular material e' filled in the small groove 24 (upper side of the virtual line P in FIG. 16A), whereby filing efficiency of the powder/granular material on the upper part side of the recessed portion 17c can be improved.

When the return side of the rotating disc 10 returns to the annular transport space 5 through the upward groove 26, the powder/granular material e' has been already filled in the small groove 24 of the recessed portion 17c reliably (see FIGS. 13 and 16A) and thus, in the annular transport space 5, it is only necessary that the powder/granular material having been transported by the cater rotating blade 9 and the like is dropped and supplied onto the powder/granular material e'. That is, in the annular transport space 5 on the return side, the powder/granular material e to be newly discharged is dropped and supplied onto the powder/granular material e' in the small groove 24 and is scraped by the cuter rotating blade 9 and the lower surface of the outer cylinder 2 with rotation of the rotating disc 10 in the arrow B direction and as a result, when the rotating disc 10 is transported to the outside of the outer cylinder 2, the powder/granular material can be reliably filled on the recessed portion 17c to the position T at the same level as the upper surface 10a of the rotating disc 10 (see the powder/granular material e in FIGS. 6 and 16A).

Here, a case in which the recessed portion 17 of the powder/granular-material discharge groove 17 is not present, the powder/granular material of the inclined portion 17b in the vicinity of the outer peripheral edge in the powder/granular-material discharge groove 17 is discharged by the block portion 31 of the fixed small scraper 19, and the surface (metal surface M) of the inclined portion 17b at the position corresponding to the block portion 31 is exposed (FIG. 16B) will be examined. In this case, on the return side, the powder/granular material needs to be filled directly on the metal surface M where no powder/granular material of the inclined portion 17b of the powder/granular-material discharge groove 17 is present, but by further filling the powder/granular material on the powder/granular material e' filled in the recessed portion 17c rather than by directly supplying the powder/granular material to the metal surface M, the powder/granular material can be filled more easily, and filling efficiency of the powder/granular material can be improved. This is considered to be caused by the fact that a friction coefficient between the powder/granular material and the powder/granular material is larger than the friction coefficient between the metal and the powder/granular material (see FIG. 16A).

As a result, particularly, a sufficient amount of the powder/granular material can be filled to the position T at all times in the vicinity of the outer peripheral edge in the powder/granular-material discharge groove 17 of the rotating disc 10 corresponding to the block portion 31 of the fixed email scraper 19, whereby discharge accuracy of the powder/granular material by the block portion 31 of the fixed small scraper 19 in the small supply can be improved.

Then, the powder/granular material in which the raised portion R has been formed is transported to the downstream side by rotation of the rotating disc 10 in the arrow B direction and is smoothly transported to the annular transport space 5 side through the up ware groove 26 of the outer cylinder 2.

At this time, since the projection 8a of the outer rotating ring 8 is transported in the arrow A direction, the powder/granular material e having been transported from the upward groove 26 to the annular transport space a side enters into the return space S between the projection 8a and the projection 8a and is smoothly transported in the arrow A direction, that is, to the downstream side. As a result, the powder/granular material is not retained in the vicinity of the upward groove 26 (return portion) but the powder/granular material e can be smoothly returned to the annular transport space 5 side.

The powder/granular material e having entered in the return space S is transported to the downstream side but can make a circle in the annular transport space S and can be supplied again into the powder/granular-material discharge groove 17 at the position of the rotating disc 10, and this operation is repeated.

Moreover, since each of the projections 8a of the outer rotating ring 8 crosses above the position T on the upper surface of the powder/granular-material discharge groove 17, the powder/granular material on the upper surface of the discharge groove 17 can be leveled, and the powder/granular material of the raised portion R can be also filled on the upper part of the recessed portion 17c efficiency by the projections 8a.

In the above-described embodiment, the rotating speed of the rotating disc 10 in the small supply is made lower than that in the large supply, but the speed of the rotating disc 10 may be the same speed as that in the large supply without lowering the speed in the small supply. In this case, too, as compared with the large supply by the vertically-movable scraper 18, a small amount of the powder/granular material can be supplied and discharged by the block portion 31 of the fixed small scraper 13 in the small supply and thus, accurate batch metering can be made even if the speed of hire rotating disc 10 is made the same speed as that in the large supply.

As an example, a target value was metered with a sampling time of 10 seconds by using the fixed small scraper 19 in FIG. 14E, the "soybean flour" as the powder/granular material, the rotating speed 6 [r/min] of the variable speed motor 22, the rotating speed of the variable speed motor 16 at 28 [r/min] in the large supply and 9 [r/min] in the small supply, the target value H=50 g, and the proximate value G=19 g. As a result, the metered value could be accommodated within a range from 50.11 g to 50.24 g with respect to the target value of 50 g.

Moreover, substantially the same metering accuracy could be obtained even if the rotating speed of the variable speed motor 16 is set at the same speed of 28 [r/min] for both in the large supply and the small supply under the same condition as above.

In the present invention, as described above, in the batch type metered supply operation, the powder/granular material is discharged in the state in which the vertically-movable scraper 18 is located at the lowered position P2 in the large supply and at the time when the predetermined amount of the powder/granular material has been discharged, the vertically-movable scraper 18 is raised, and after that, the small supply operation is performed by the fixed small scraper 19, and when the target value Hg is reached, the operation such as stopping of the central rotating blade 7 and the rotating disc 10 can be performed, whereby metered supply of the powder/granular material can be made extremely accurately.

Moreover, by lowering the rotating speed of the rotating disc in the small supply, more accurate batch type metered supply can be performed. Moreover, even if the rotating speed of the rotating disc in the small supply is set to the same speed as that in the large supply without lowering the rotating speed of the rotating disc, accurate batch type metered supply can be performed by making the small supply by the fixed small scraper 19 in the small supply.

Moreover, the fixed small scrapers 19 with different areas of the block portions 31 can be used depending on the nature or the metered value of the powder/granular material, and an extremely wide range of the batch metering can be handled.

Moreover, the powder/granular material on the return side in the rotating disc 10 can be smoothly returned to the annular transport space 5 side, and retention of the powder/granular material on the return side can be prevented.

Moreover, the powder/granular material having returned to the annular transport space 5 side from the rotating disc 10 can be filled in the return space S in the outer rotating ring 8 and can be smoothly transported to the downstream side, and retention of the powder/granular material on the return side can be prevented, and each of the projections 8a can level the powder/granular material in the powder/granular-material discharge groove 17 of the rotating disc 10 and improve filling efficiency.

Moreover, since the powder/granular material to be newly discharged is filled on the powder/granular material remaining in the recessed, portion 17c, the powder/granular material into the powder/granular-material discharge groove 17 on the return side can be made to be filled more easily, whereby filling efficiency of the powder/granular material, can be improved.

According to the metering feeder according to the present invention, metered supply of the powder/granular material can be realized with extremely high accuracy, and the metering feeder can be used widely in metered supply of various powder/granular materials.

REFERENCE SIGNS LIST 1 inner cylinder
2 outer cylinder
4 bottom plate
5 annular transport space
6 upright rotating shaft
7 spoke-shaped central rotating blade
8 outer rotating ring
8a projection
9 outer rotating blade
10 rotating disc
10a upper surface
11 rectangular support device
13 rectangular discharge opening
17 powder/granular-material discharge groove
17c recessed portion
18 vertically-movable scraper
19 fixed small scraper
23 scraper support portion
24 small groove
25 loosening rod
25a loosening portion
26 upward groove
31 block portion
33 air cylinder
33a vertical elevating driving shaft
35 housing
t gap
P1 raised position
P2 lowered position
S return space

The invention claimed is:

1. A metering feeder formed by inner and outer cylinders sharing a center line, having a gap between a bottom plate of the outer cylinder and a lower end of the inner cylinder, an annular transport space for a powder/granular material being provided between the inner and outer cylinders, an outer rotating ring provided along an inner periphery of the outer cylinder being connected to a tip end of a central rotating blade provided on an upright rotating shaft projected at a center part of the bottom plate, a plurality of outer rotating blades directed toward an inside being provided on the outer rotating ring, a rotating disc having an upper surface on the same plane as an upper surface of the bottom plate being provided, a powder/granular-material discharge groove concentric with the disc being formed on the upper surface of the rotating disc, the powder/granular-material discharge groove supporting the rotating disc on a support machine frame so that it is disposed over an inside and outside of the outer cylinder, the powder/granular material in the annular transport space being metered by the outer rotating blade and supplied to the powder/granular-material discharge groove by rotating the central rotating blade and the rotating disc in the same direction, and the powder/granular material being transported to an outside of the cylinder by the powder/granular-material discharge groove, the metering feeder comprising:

a discharge opening provided in the support machine frame on an outer side of the rotating disc outside the outer cylinder, and in the powder/granular-material discharge groove of the rotating disc, a vertically-movable scraper for large supply, fitted with the powder/granular-material discharge groove for blocking the powder/granular material in the powder/granular-material discharge groove and for guiding it to the discharge opening and a fixed small scraper for small supply and for blocking a part of the powder/granular material in the discharge groove on a downstream side of the vertically-movable scraper and guiding it to the discharge opening are provided; and wherein the vertically-movable scraper is made capable of elevating between a lowered position fitted in the powder/granular-material discharge groove and a raised position away from the powder/granular-material discharge groove by elevating driving means;

wherein outside the outer cylinder, on a downstream side of the fixed small scraper in the powder/granular-material discharge groove of the rotating disc, a loosening rod having a loosening portion for the powder/granular material on a lower end is inserted into and fixed to the powder/granular-material discharge groove from an upper surface side of the discharge groove;

wherein an upward groove is provided on a lower surface of the outer cylinder at a position where the powder/granular-material discharge groove on a return side of the rotating disc passes so that the powder/granular material loosened by the loosening rod returns from the upward groove into the annular transport space;

wherein on an outer peripheral surface of the outer rotating ring, a plurality of projections close to the inner periphery of the outer cylinder are provided, and a plurality of return spaces of the powder/granular material are formed between the adjacent projections; and wherein the powder/granular material returning into the annular transport space is filled in the return space through the upward groove and is made capable of being transported to a downstream side of the annular transport space by rotation of the central rotating blade.

2. The metering feeder according to claim 1, wherein by hollowing out a ring shape in an inner surface on an outer periphery side of the powder/granular-material discharge groove of the rotating disc, a recessed portion made of a ring-shaped small groove having a certain width is formed and configured such that the vertically-movable scraper is not located in the recessed portion in lowering of the vertically-movable scraper, but only the powder/granular material in the recessed portion passes the vertically-movable scraper and is transported to the downstream side;

the fixed small scraper is configured such that the powder/granular material located on an upper side from the powder/granular material of the recessed portion is discharged, whereby the powder/granular material in the recessed portion is not discharged but remains; and the powder/granular material to be subsequently discharged onto the powder/granular material in the recessed portion is configured to be filled on the downstream side from the fixed small scraper.

3. A metering feeder formed by inner and outer cylinders sharing a center line, having a gap between a bottom plate of the outer cylinder and a lower end of the inner cylinder, an annular transport space for a powder/granular material being provided between the inner and outer cylinders, an outer rotating ring provided along an inner periphery of the outer cylinder being connected to a tip end of a central rotating blade provided on an upright rotating shaft projected at a center part of the bottom plate, a plurality of outer rotating blades directed toward an inside being provided on the outer rotating ring, a rotating disc having an upper surface on the same plane as an upper surface of the bottom plate being provided, a powder/granular-material discharge groove concentric with the disc being formed on the upper surface of the rotating disc, the powder/granular-material discharge groove supporting the rotating disc on a support machine frame so that it is disposed over an inside and outside of the outer cylinder, the powder/granular material in the annular transport space being metered by the outer rotating blade and supplied to the powder/granular-material discharge groove by rotating the central rotating blade and the rotating disc in the same direction, and the powder/granular material being transported to an outside of the cylinder by the powder/granular-material discharge groove, the metering feeder comprising:

a discharge opening is provided in the support machine frame on an outer side of the rotating disc outside the outer cylinder, and in the powder/granular-material discharge groove of the rotating disc, a vertically-movable scraper for large supply, fitted with the powder/granular-material discharge groove for blocking the powder/granular material in the powder/granular-material discharge groove and for guiding it to the discharge opening and a fixed small scraper for small supply and for blocking a part of the powder/granular material in the discharge groove on a downstream side of the vertically-movable scraper and guiding it to the discharge opening are provided; and wherein the vertically-movable scraper is made capable of elevating between a lowered position fitted in the powder/granular-material discharge groove and a raised position away from the powder/granular-material discharge groove by elevating driving means;

wherein the fixed small scraper has a block portion located in the powder/granular-material discharge groove on the lower end portion thereof and blocking a part of the powder/granular material and it is detachably provided on a scraper support portion fixed to the support machine frame; and wherein the fixed small scraper is provided capable of being replaced with another fixed small scraper having a block portion with a different area in the scraper support portion;

wherein outside the outer cylinder, on a downstream side of the fixed small scraper in the powder/granular-material discharge groove of the rotating disc, a loosening rod having a loosening portion for the powder/granular material on a lower end is inserted into and fixed to the powder/granular-material discharge groove from an upper surface side of the discharge groove; and wherein an upward groove is provided on a lower surface of the outer cylinder at a position where the powder/granular-material discharge groove on a return side of the rotating disc passes so that the powder/granular material loosened by the loosening rod returns from the upward groove into the annular transport space;

wherein on an outer peripheral surface of the outer rotating ring, a plurality of projections close to the inner periphery of the outer cylinder are provided, and a plurality of return spaces of the powder/granular material are formed between the adjacent projections; and wherein the powder/granular material returning into the annular transport space is filled in the return space through the upward groove and is made capable of being transported to a downstream side of the annular transport space by rotation of the central rotating blade.

4. A metering feeder formed by inner and outer cylinders sharing a center line, having a gap between a bottom plate of the outer cylinder and a lower end of the inner cylinder, an annular transport space for a powder/granular material being provided between the inner and outer cylinders, an outer rotating ring provided along an inner periphery of the outer cylinder being connected to a tip end of a central rotating blade provided on an upright rotating shaft projected at a center part of the bottom plate, a plurality of outer rotating blades directed toward an inside being provided on the outer rotating ring, a rotating disc having an upper surface on the same plane as an upper surface of the bottom plate being provided, a powder/granular-material discharge groove concentric with the disc being formed on the upper surface of the rotating disc, the powder/granular-material discharge groove supporting the rotating disc on a support machine frame so that it is disposed over an inside and outside of the outer cylinder, the powder/granular material in the annular transport space being metered by the outer rotating blade and supplied to the powder/granular-material discharge groove by rotating the central rotating blade and the rotating disc in the same direction, and the powder/granular material being transported to an outside of the cylinder by the powder/granular-material discharge groove, the metering feeder comprising:

a discharge opening is provided in the support machine frame on an outer side of the rotating disc outside the outer cylinder, and in the powder/granular-material discharge groove of the rotating disc, a vertically-movable scraper for large supply, fitted with the powder/granular-material discharge groove for blocking the powder/granular material in the powder/granular-material discharge groove and for guiding it to the discharge opening and a fixed small scraper for small supply and for blocking a part of the powder/granular material in the discharge groove on a downstream side of the vertically-movable scraper and guiding it to the discharge opening are provided; and wherein the vertically-movable scraper is made capable of elevating between a lowered position fitted in the powder/granular-material discharge groove and a raised position away from the powder/granular-material discharge groove by elevating driving means;

wherein by hollowing out a ring shape in an inner surface on an outer periphery side of the powder/granular-material discharge groove of the rotating disc, a recessed portion made of a ring-shaped small groove having a certain width is formed and configured such that the vertically-movable scraper is not located in the recessed portion in lowering of the vertically-movable scraper, but only the powder/granular material in the recessed portion passes the vertically-movable scraper and is transported to the downstream side;

wherein the fixed small scraper is configured such that the powder/granular material located on an upper side from the powder/granular material of the recessed portion is discharged, whereby the powder/granular material in the recessed portion is not discharged but remains; and wherein the powder/granular material to be subsequently discharged onto the powder/granular material in the recessed portion is configured to be filled on the downstream side from the fixed small scraper.

5. A metering feeder formed by inner and outer cylinders sharing a center line, having a gap between a bottom plate of the outer cylinder and a lower end of the inner cylinder, an annular transport space for a powder/granular material being provided between the inner and outer cylinders, an outer rotating ring provided along an inner periphery of the outer cylinder being connected to a tip end of a central rotating blade provided on an upright rotating shaft projected at a center part of the bottom plate, a plurality of outer rotating blades directed toward an inside being provided on the outer rotating ring, a rotating disc having an upper surface on the same plane as an upper surface of the bottom plate being provided, a powder/granular-material discharge groove concentric with the disc being formed on the upper surface of the rotating disc, the powder/granular-material discharge groove supporting the rotating disc on a support machine frame so that it is disposed over an inside and outside of the outer cylinder, the powder/granular material in the annular transport space being metered by the outer rotating blade and supplied to the powder/granular-material discharge groove by rotating the central rotating blade and the rotating disc in the same direction, and the powder/granular material being transported to an outside of the cylinder by the powder/granular-material discharge groove, the metering feeder comprising:

a discharge opening is provided in the support machine frame on an outer side of the rotating disc outside the outer cylinder, and in the powder/granular-material discharge groove of the rotating disc, a vertically-movable scraper for large supply, fitted with the powder/granular-material discharge groove for blocking the powder/granular material in the powder/granular-material discharge groove and for guiding it to the discharge opening and a fixed small scraper for small supply and for blocking a part of the powder/granular material in the discharge groove on a downstream side of the vertically-movable scraper and guiding it to the discharge opening are provided; and wherein the vertically-movable scraper is made capable of elevating between a lowered position fitted in the powder/granular-material discharge groove and a raised position away from the powder/granular-material discharge groove by elevating driving means;

wherein the fixed small scraper has a block portion located in the powder/granular-material discharge groove on the lower end portion thereof and blocking a part of the powder/granular material and it is detachably provided on a scraper support portion fixed to the support machine frame;

wherein the fixed small scraper is provided capable of being replaced with another fixed small scraper having a block portion with a different area in the scraper support portion;

wherein by hollowing out a ring shape in an inner surface on an outer periphery side of the powder/granular-material discharge groove of the rotating disc, a recessed portion made of a ring-shaped small groove having a certain width is formed and configured such that the vertically-movable scraper is located in the recessed portion in lowering vertically-movable scraper, but only the powder/granular material in the recessed portion passes the vertically-movable scraper and is transported to the downstream side;

wherein the fixed small scraper is configured such that the powder/granular material located on an upper side from the powder/granular material of the recessed portion is discharged, whereby the powder/granular material in the recessed portion is not discharged but remains; and wherein the powder/granular material to be subsequently discharged onto the powder/granular material in the recessed portion is configured to be filled on the downstream side from the fixed small scraper.

6. A metering feeder formed by inner and outer cylinders sharing a center line, having a gap between a bottom plate of the outer cylinder and a lower end of the inner cylinder, an annular transport space for a powder/granular material being provided between the inner and outer cylinders, an outer rotating ring provided along an inner periphery of the outer cylinder being connected to a tip end of a central rotating blade provided on an upright rotating shaft projected at a center part of the bottom plate, a plurality of outer rotating blades directed toward an inside being provided on the outer rotating ring, a rotating disc having an upper surface on the same plane as an upper surface of the bottom plate being provided, a powder/granular-material discharge groove concentric with the disc being formed on the upper surface of the rotating disc, the powder/granular-material discharge groove supporting the rotating disc on a support machine frame so that it is disposed over an inside and outside of the outer cylinder, the powder/granular material in the annular transport space being metered by the outer rotating blade and supplied to the powder/granular-material discharge groove by rotating the central rotating blade and the rotating disc in the same direction, and the powder/granular material being transported to an outside of the cylinder by the powder/granular-material discharge groove, the metering feeder comprising:

a discharge opening is provided in the support machine frame on an outer side of the rotating disc outside the outer cylinder, and in the powder/granular-material discharge groove of the rotating disc, a vertically-movable scraper for large supply, fitted with the powder/granular-material discharge groove for blocking the powder/granular material in the powder/granular-material discharge groove and for guiding it to the discharge opening and a fixed small scraper for small supply and for blocking a part of the powder/granular material in the discharge groove on a downstream side of the vertically-movable scraper and guiding it to the discharge opening are provided; and wherein the vertically-movable scraper is made capable of elevating between a lowered position fitted in the powder/granular-material discharge groove and a raised position away from the powder/granular-material discharge groove by elevating driving means;

wherein the fixed small scraper has a block portion located in the powder/granular-material discharge groove on the lower end portion thereof and blocking a part of the powder/granular material and it is detachably provided on a scraper support portion fixed to the support machine frame; and wherein the fixed small scraper is provided capable of being replaced with another fixed small scraper having a block portion with a different area in the scraper support portion;

wherein outside the outer cylinder, on a downstream side of the fixed small scraper in the powder/granular-material discharge groove of the rotating disc, a loosening rod having a loosening portion for the powder/granular material on a lower end is inserted into and fixed to the powder/granular-material discharge groove from an upper surface side of the discharge groove; and wherein an upward groove is provided on a lower surface of the outer cylinder at a position where the powder/granular-material discharge groove on a return side of the rotating disc passes so that the powder/granular material loosened by the loosening rod returns from the upward groove into the annular transport space;

wherein by hollowing out a ring shape in an inner surface on an outer periphery side of the powder/granular-material discharge groove of the rotating disc, a recessed portion made of a ring-shaped small groove having a certain width is formed and configured such that the vertically-movable scraper is not located in the recessed portion in lowering of the vertically-movable scraper, but only the powder/granular material in the recessed portion passes the vertically-movable scraper and is transported to the downstream side;

wherein the fixed small scraper is configured such that the powder/granular material located on an upper side from the powder/granular material of the recessed portion is discharged, whereby the powder/granular material in the recessed portion is not discharged but remains; and wherein the powder/granular material to be subsequently discharged onto the powder/granular material in the recessed portion is configured to be filled on the downstream side from the fixed small scraper.

* * * * *